US010328641B1

(12) United States Patent
Johnson et al.

(10) Patent No.: US 10,328,641 B1
(45) Date of Patent: Jun. 25, 2019

(54) THERMOPLASTIC COMPOSITE TUBULAR LINEAL FORMING SYSTEM AND METHOD

(71) Applicant: Ebert Composites Corporation, Chula Vista, CA (US)

(72) Inventors: David W. Johnson, San Diego, CA (US); Scott A. Garrett, San Diego, CA (US); Stephen G. Moyers, Jamul, CA (US)

(73) Assignee: Ebert Composites Corporation, Chula Vista, CA (US)

( * ) Notice: Subject to any disclaimer, the term of this patent is extended or adjusted under 35 U.S.C. 154(b) by 0 days.

(21) Appl. No.: 15/986,237

(22) Filed: May 22, 2018

Related U.S. Application Data

(60) Provisional application No. 62/510,093, filed on May 23, 2017.

(51) Int. Cl.
   *B29C 70/52* (2006.01)
   *B29L 23/00* (2006.01)
   *B29K 101/12* (2006.01)

(52) U.S. Cl.
   CPC .......... *B29C 70/521* (2013.01); *B29C 70/526* (2013.01); *B29C 70/528* (2013.01); *B29K 2101/12* (2013.01); *B29K 2905/12* (2013.01); *B29L 2023/22* (2013.01)

(58) Field of Classification Search
   CPC ... B29C 70/521; B29C 70/528; B29C 70/526; B29K 2905/12; B29K 2101/12; B29L 2023/22
   See application file for complete search history.

(56) References Cited

U.S. PATENT DOCUMENTS 5,174,844 A * 12/1992 Tong ...................... B29C 70/523
                                                    156/180

FOREIGN PATENT DOCUMENTS

WO    WO 2016/180901    * 11/2016    ................ F16C 3/02

* cited by examiner

*Primary Examiner* — Robert J Grun
(74) *Attorney, Agent, or Firm* — Procopio Cory Hargreaves and Savitch LLP

(57) ABSTRACT

A method of processing a thermoplastic composite tubular lineal comprising providing a pre-pregged thermoplastic composite around an elongated stationary mandrel; wrapping the pre-pregged thermoplastic composite with a release material; heating the stationary mandrel so that the pre-pregged thermoplastic composite melts and the release material contracts, exerting pressure on the pre-pregged material; cooling the pre-pregged material and release material so as to form a thermoplastic composite tubular lineal in its final configuration; pulling the thermoplastic composite tubular lineal downstream; and removing the release material from the thermoplastic composite tubular lineal.

21 Claims, 19 Drawing Sheets

THERMOPLASTIC COMPOSITE TUBULAR LINEAL FORMING SYSTEM AND METHOD

CROSS REFERENCE TO RELATED APPLICATIONS

This application claims the benefit of U.S. Provisional Patent Application No. 62/510,093, filed on May 23, 2017, which is incorporated by reference herein.

FIELD OF THE INVENTION

The present invention relates to thermoplastic composite pultrusion systems and methods of processing lineals that are tubular, meaning they are formed continuously on a mandrel with an annular-wall.

BACKGROUND OF THE INVENTION

In recent times, advances have been made in thermoplastic composites processing, most of which still require molds to stamp and mimic the processes available in thermoset composites and metals. The current process allows the continuous production of thermoplastic composite tubes of varying wall thickness and diameter.

SUMMARY OF THE INVENTION

An aspect of this invention involves three alternative methods of processing continuously thermoplastic composite tubes. The first involves a 45-degree wrapping of the prepregged thermoplastic composite around a stationary mandrel with a special polyamide film that is used as a release material. The film is special as it shrinks from 20% to 40% when a specific amount of elevated temperature is reached, thus allowing a pressure to be exerted on the wrapped material. This is coupled with a coiled induction heater/welder that either intermittently or continuously applies energy through a circled-coil around the package (package in this case is the mandrel made of steel, the thermoplastic composite pre-preg material and the polyamide film further wrapped on the outside.) The energy from the induction heater/welder raises the temperature of the mandrel, allowing the pre-pregged composite material to reach near-melt-temperatures and the polyamide film to shrink.

Through downstream cooling the part can be "frozen" and thus hardened in its final shape and capable of being pulled downstream with traditional pultrusion grippers, pulling said tubular lineal from the stationary mandrel. A specific advancement is the induction heater/welder as it can raise the mandrel temperature from 75 degrees F. to 750 degrees F. in a matter of 7.0 seconds (or less with settings adjusted). Thus very fast processing speeds can be achieved with this technique.

A second alternative to the downstream cooling is the second alternative aspect of the invention. A set of matched dies can be used to process the tubular material further into a round annular shape. Assuming the polyamide wrapped tape does not fully consolidate the composite tube, an additional step can be added wherein matched die sets are actuated robotically to press a portion of the tube surface against the mandrel. One or more rotations of these matched die sets allow the complete 360-degrees of the tube to be pressed against the mandrel. These press steps are very similar to steps described further herein. The upstream portion of these die sets are heated and the downstream portion of these die sets are cooled. The reason for the rotation of these die plates is the need to press on less than 180-degrees of the cross section, as the process cannot leave a parting line, or scrape the composite pre-pregged material with the release. The 180 degrees would provide zero normal force and catch raw material in the parting line. Shown in this disclosure is a die inside surface with approximately 120-degrees of the contoured surface of the final tubular shape.

A third alternative to the above two alternatives is to have a process like the second alternative, but eliminate the induction heater/welder.

Another aspect of this invention is produce thermoplastic composite tubes without molds, without an autoclave, and without a furnace.

A further aspect of this invention is to use thermoplastic pre-pregged material that is a combination of fibers that are glass, carbon, aramid, and the like with resins that are of the entire family of thermoplastic resins such as polyethylene, polypropylene, polyethylene, terephthalate, polycarbonate, polyetherketone-family (PEK, PEKK, PEEK), polyphenylene sulfide, and the like.

Another aspect of this invention is to make a robotic process that can allow manufacturing in a lights out factory with no humans, and to provide a 100% robotic manufacturing facility.

Another aspect of this invention is to produce tubular lineals that are capable of being at least 100 to 150 meters in length, a length not possible with traditional thermoplastic composite processes.

Another aspect of the invention is to allow the processing of tubes from 2.0 mm of inside diameter to 4.0 meters of inside diameter. These can have a variety of wall thicknesses and configurations from solid walls to hybrid mix of wall materials, to sandwich structure walls with non-delaminating features.

A further aspect of the invention involves a method of processing a thermoplastic composite tubular lineal. The method comprises providing a pre-pregged thermoplastic composite around an elongated stationary mandrel; wrapping the pre-pregged thermoplastic composite with a release material; heating the stationary mandrel so that the pre-pregged thermoplastic composite melts and the release material contracts, exerting pressure on the pre-pregged material; cooling the pre-pregged material and release material so as to form a thermoplastic composite tubular lineal in its final configuration; pulling the thermoplastic composite tubular lineal downstream; removing the release material from the thermoplastic composite tubular lineal.

One or more implementations of the aspect of the invention described immediately above includes one or more of the following: providing a pre-pregged thermoplastic composite includes automatically circumferentially spacing pre-pregged thermoplastic composite material around a circumference of the elongated stationary mandrel; wrapping the pre-pregged thermoplastic composite with a release material includes automatically rotating the release material around the elongated stationary mandrel and automatically wrapping the release material around the pre-pregged thermoplastic composite; wrapping the pre-pregged thermoplastic composite with a release material includes automatically wrapping the release material at an angle around the pre-pregged thermoplastic composite; the angle is 45 degrees; heating the stationary mandrel includes automatically heating the stationary mandrel with an induction heater and welder; the induction heater and welder includes water-cooled coils and loops, and the method further includes providing the water-cooled coils and loops coiled around the stationary mandrel and movable pre-pregged thermoplastic composite; heating the stationary mandrel so that the pre-pregged thermoplastic composite melts and the release material contracts includes automatically heating the stationary mandrel so that the release material contracts 20-40%; heating the stationary mandrel includes automatically raising a temperature in the stationary mandrel at least 100 degrees F. in at least 1.0 seconds with an induction heater and welder; cooling the pre-pregged material and release material includes automatically air-cooling the pre-pregged material and release material; pulling the thermoplastic composite tubular lineal downstream includes automatically pulling the thermoplastic composite tubular lineal downstream with a series of grippers; removing the release material from the thermoplastic composite tubular lineal occurs upstream or downstream of the series of grippers; a die set of two or more die members with partially circular inner surfaces, and the method further including automatically clamping the two or more die members onto the pre-pregged material and release material, automatically unclamping the two or more die members from the pre-pregged material and release material, automatically rotating the two or more die members about the stationary mandrel, and repeating the clamping and unclamping at two or more circumferential locations on the thermoplastic composite tubular lineal with the two or more die members so that full consolidation of 360 degrees of a surface of the pre-pregged material and release material into a round annular shape occurs; the two or more die members each include an upstream heating section and a downstream cooling section, and the method further including automatically heating the pre-pregged material and release material with the upstream heating section and cooling the pre-pregged material and release material with the downstream cooling section; the partially circular inner surfaces are less than 360 degrees/number of die members; the two or more die members are chamfered so that any one of the two or more die members do not touch each other; the pre-pregged material and release material is automatically moved incrementally, and the clamping and unclamping steps are performed when the pre-pregged material and release material is at zero line speed; the pre-pregged thermoplastic composite includes one or more fibers from the group of glass, carbon, and aramid, and the pre-pregged thermoplastic composite includes one or more thermoplastic resins from the group of polyethylene, polypropylene, polyethylene, terephthalate, polycarbonate, polyetherketone-family (PEK, PEKK, PEEK), and polyphenylene sulfide; the thermoplastic composite tubular lineal is 100 to 150 meters in length; the thermoplastic composite tubular lineal includes an inside diameter of 2.0 mm to 4.0 meters; and/or the thermoplastic composite tubular lineal is made of a wall having one or more of a solid wall, a hybrid mix of wall materials, and a sandwich structure with non-delaminating features.

An additional aspect of the invention involves a method of processing a thermoplastic composite tubular lineal comprising providing a pre-pregged thermoplastic composite around an elongated stationary mandrel; wrapping the pre-pregged thermoplastic composite with a release material; clamping two or more die members onto the pre-pregged material and release material, the two or more die members including partially circular inner surfaces, unclamping the two or more die members from the pre-pregged material and release material, rotating the two or more die members about the stationary mandrel, and repeating the clamping and unclamping at two or more circumferential locations on the thermoplastic composite tubular lineal with the two or more die members so that full consolidation of 360 degrees of a surface of the pre-pregged material and release material into a round annular shape occurs; pulling the thermoplastic composite tubular lineal downstream;
removing the release material from the thermoplastic composite tubular lineal.

One or more implementations of the aspect of the invention described immediately above includes one or more of the following: the two or more die members each include an upstream heating section and a downstream cooling section, and the method further including automatically heating the pre-pregged material and release material with the upstream heating section and automatically cooling the pre-pregged material and release material with the downstream cooling section; providing a pre-pregged thermoplastic composite includes automatically circumferentially spacing pre-pregged thermoplastic composite material around a circumference of the elongated stationary mandrel; wrapping the pre-pregged thermoplastic composite with a release material includes automatically rotating the release material around the elongated stationary mandrel and automatically wrapping the release material around the pre-pregged thermoplastic composite; wrapping the pre-pregged thermoplastic composite with a release material includes automatically wrapping the release material at an angle around the pre-pregged thermoplastic composite; the angle is 45 degrees; pulling the thermoplastic composite tubular lineal downstream includes automatically pulling the thermoplastic composite tubular lineal downstream with a series of grippers; removing the release material from the thermoplastic composite tubular lineal occurs upstream or downstream of the series of grippers; the partially circular inner surfaces are less than 360 degrees/number of die members; the two or more die members are chamfered so that any one of the two or more die members do not touch each other; the pre-pregged material and release material is automatically moved incrementally, and the clamping and unclamping steps are performed when the pre-pregged material and release material is at zero line speed; the pre-pregged thermoplastic composite includes one or more fibers from the group of glass, carbon, and aramid, and the pre-pregged thermoplastic composite includes one or more thermoplastic resins from the group of polyethylene, polypropylene, polyethylene, terephthalate, polycarbonate, polyetherketone-family (PEK, PEKK, PEEK), and polyphenylene sulfide; the thermoplastic composite tubular lineal is 100 to 150 meters in length; the thermoplastic composite tubular lineal includes an inside diameter of 2.0 mm to 4.0 meters; and/or the thermoplastic composite tubular lineal is made of a wall having one or more of a solid wall, a hybrid mix of wall materials, and a sandwich structure with non-delaminating features.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

With reference to FIGS. 1-11, before describing embodiments of a long thermoplastic composite tubular lineal forming system and method, a number of embodiments of a thermoplastic pultrusion die system ("system") 300 and method of processing using the same will first be described. The long thermoplastic composite tubular lineal forming system and method is an improvement on the system 300 and method.

Figure 1A:
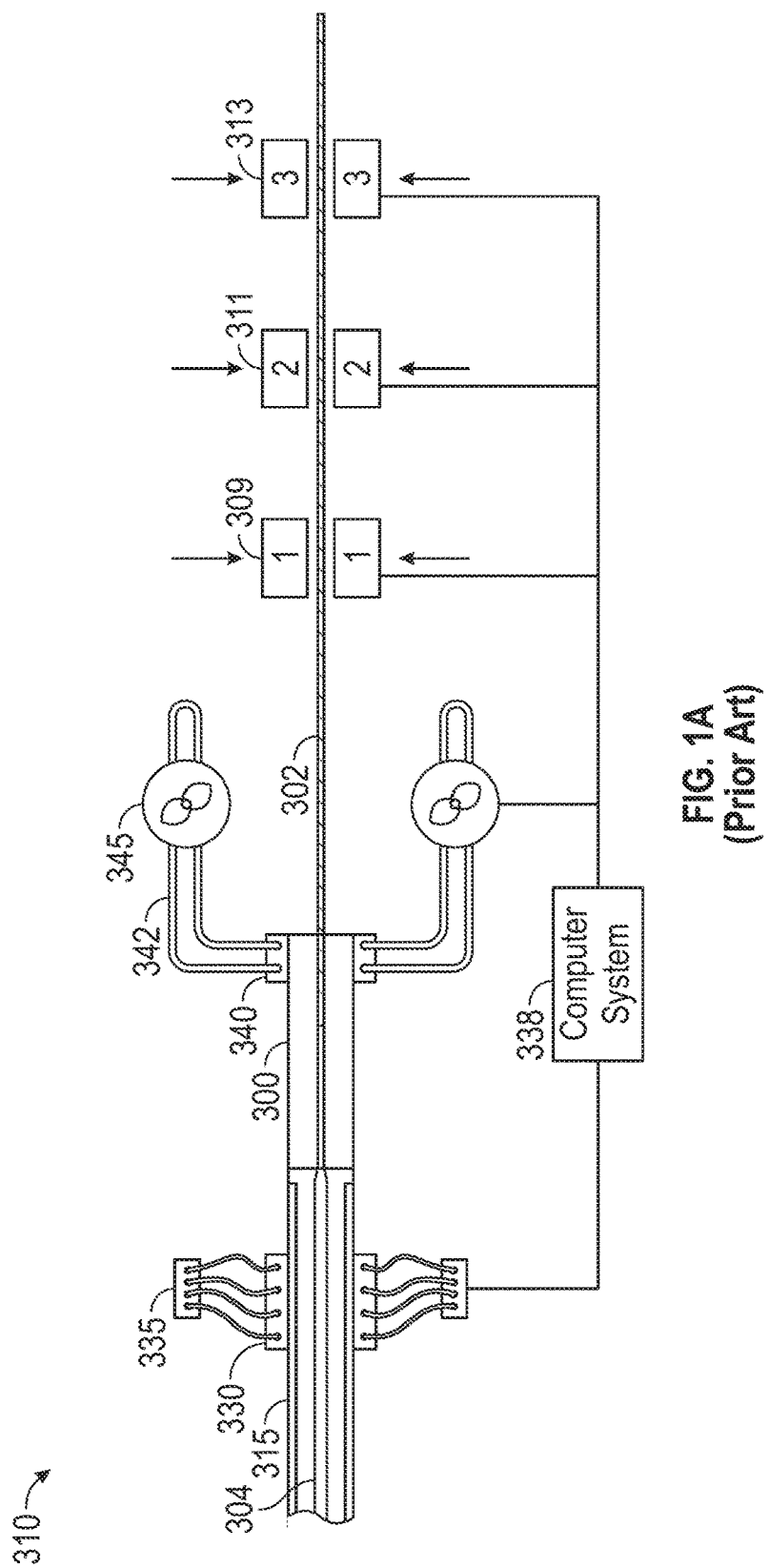
FIG. 1A is a diagram of an embodiment of an exemplary thermoplastic composite tape pultrusion process in which the thermoplastic pultrusion die system and method of the present invention may be incorporated into in one application.

With reference to FIG. 1A, before describing the system 300, an embodiment of an exemplary thermoplastic composite tape pultrusion processing assembly 310 and method that the thermoplastic pultrusion die system 300 and method may be a part of will first be described.

In the thermoplastic composite tape pultrusion processing assembly 310, the pultrusion process moves from left to right. From left-to-right, the assembly 310 includes a tunnel oven 315, the thermoplastic pultrusion die system 300, and a pultrusion gripper mechanism including one or more grippers (e.g., one, two, three) 309, 311, 313 in series. In FIG. 1A, a fairly short thermoplastic pultrusion die system 300 is shown, but in actuality the thermoplastic pultrusion die system 300 may extend forward in the process 20 feet or more to assist with heating of multiple tapes or plies of thermoplastic tape to achieve faster line speeds on the processing.

The one or more grippers 309, 311, 313 pull a solid part 302 from the thermoplastic pultrusion die system 300 by clamping and pulling in a hand-over-hand method, using either a combination of one, two or three grippers at a time. In an alternative embodiment, a mechanical motive transmitter other than one or more grippers is used such as, but not by way of limitation, nip rollers or a caterpillar dive system.

Raw material 304 includes a composite material including one or more thermoplastic composite tapes entering the thermoplastic pultrusion die system 300. Before raw material 304 enters the thermoplastic pultrusion die system 300, upstream of the thermoplastic pultrusion die system 300, the thermoplastic composite tapes are preheated in a pre-heating mechanism (e.g., tunnel oven) 315, which can be heated to a temperature just below a melt temperature of the thermoplastic resin of the thermoplastic composite tapes.

As the pultruded tape material exits the thermoplastic pultrusion die system 300, it is chilled and consolidated, as represented by the solid part 302. The transition from a series of individual thermoplastic composite tapes to the solid part 302 takes place in the thermoplastic pultrusion die system 300.

The thermoplastic pultrusion die system 300 preferably includes a heating mechanism (e.g., heater or hot zone) in the front of the thermoplastic pultrusion die system 300 heated by platens 330 using a series of heaters and controllers 335. At an end of thermoplastic pultrusion die system 300, just before the pultruded tape material exits, is a cooling mechanism (e.g., cooler or chilling zone) provided by chilling platens 340, which are physically attached to thermoplastic pultrusion die system 300. The platens 340 have a cooling water circuit 342 designed to carry cooling fluids such as water to a radiating system, shown here with a fan 345. In alternative embodiments, alternative heating mechanisms and/or cooling mechanism may be used with the thermoplastic pultrusion die system 300. A computer system 338 controls one of more of the components of the assembly 310.

Figure 1B:
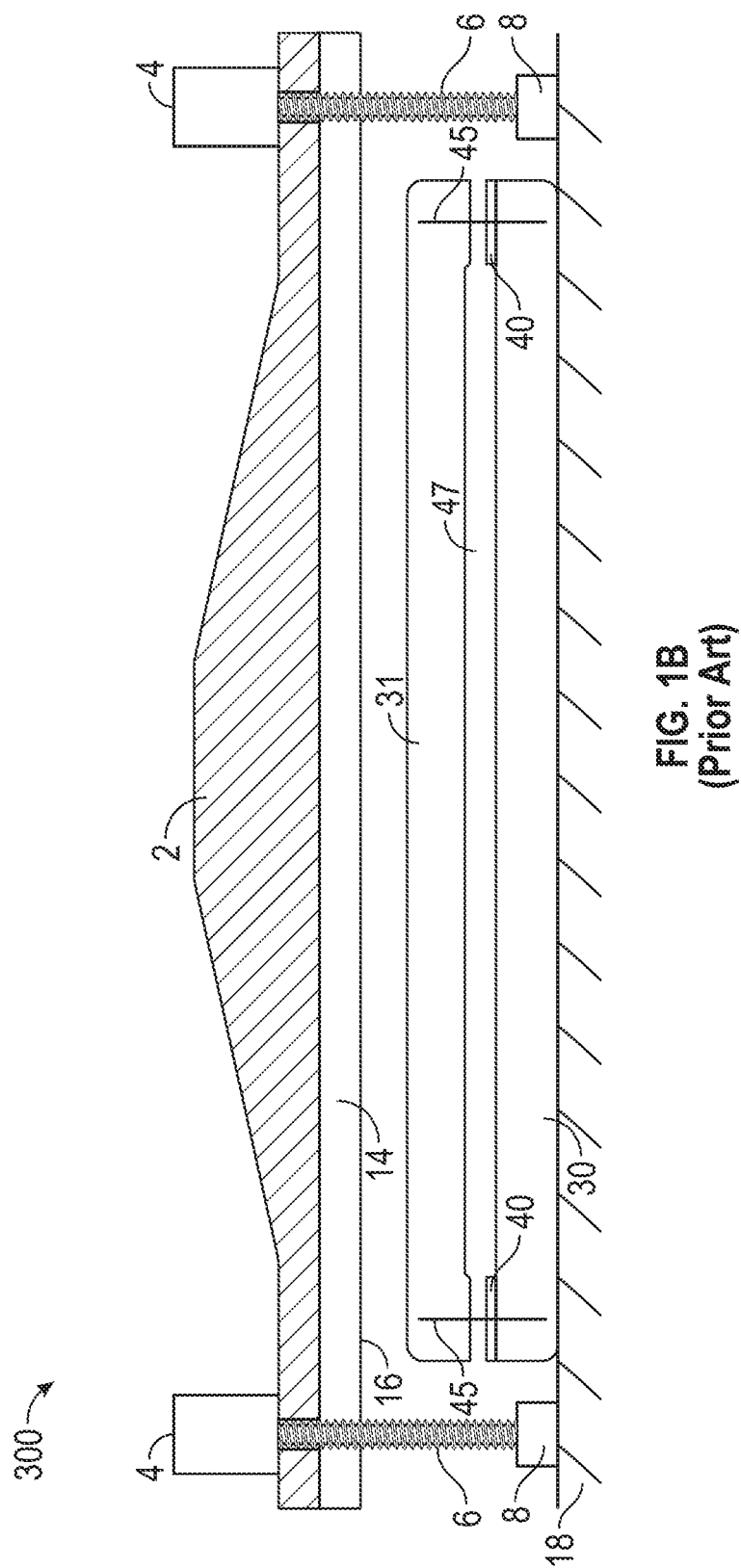
FIG. 1B is a side elevation view of an embodiment showing an end of a die and die cavity gap (end being defined as the exit of the die as one would view the die system from the position of the pultrusion grippers) of an embodiment of the thermoplastic pultrusion die system and method.

With reference to FIG. 1B, the thermoplastic pultrusion die system 300 is a die, platen, and frame arrangement. The thermoplastic pultrusion die system 300 is shown in elevation in FIG. 1B as if viewing from the pultrusion grippers 309, 311, 313 towards the downstream end of the thermoplastic pultrusion die system 300.

The thermoplastic pultrusion die system 300 includes a die bottom 30 (supported by a lower support 18) and a die top 31 separated by a die cavity gap 47. The die top 31 is bolted to the die bottom 30 at bolt holes 45. Along opposite edges of the die bottom 30 and die top 31 are elongated, narrow flat silicone seals 40. Load cells 8 are supposed by the lower support 18 are measure the load pressure at various locations in the thermoplastic pultrusion die system 300. The load cells 8 are operably coupled to CNC servo motors 4 via ball screws 6. A strongback 2 and a platen 14 move with rotation of the ball screws (and are associated with the die top 31 and/or die bottom 30) to increase or decrease the die cavity gap 47.

FIG. 1B shows the assembly of the die halves with the silicone seal 40 and the ball screws 6 with servo motors 4 and load cells 8, as one would view the system 300 prior to connecting the die top 31 to the silicone seal 40 and prior to actuating the platen 14 and the strongback 2 into intimate contact with the die top 31.

FIG. 1B illustrates the die cavity gap 47 at an exit end of the thermoplastic pultrusion die system 300. Once the die top 31 is bolted to the die bottom 30 at the bolt holes 45 shown on each the left and right hand sides of the die, then the die cavity gap 47 will be a closed cavity, but for the opening at the entrance of the die (not shown) and the opening at the exit (shown as 47 in FIG. 1B).

An important aspect of the system 300 is the two pieces of silicone seal material shown as 40 on both sides of the system 300. Although the silicone seals 40 are shown as narrow, elongated strips of silicone material, in alternative embodiments, the silicone seals 40 may be any shape/configuration. For example, but not by way of limitation, the silicone seals 40 may be round and fit into somewhat circular slots of matting flanges of both die bottom 30 and die top 31. The bolts holding the die bottom 30 and the die top 31 together would pinch the silicone seal 40. In the embodiment shown, a thread is disposed in die bottom 30 and a slip fit in die top 31. The bolts can be tightened to give a maximum die cavity gap position and no more. The minimum die cavity position is attained by actuating the platen 14, which is shown raised above the die top 31, but would be brought down into intimate contact by way of the actuated ball screws 6 that are shown on each side of the thermoplastic pultrusion die system 300. Although only two ball screws 6 are shown in FIG. 1B, the thermoplastic pultrusion die system 300 may include 4 or more actuated ball screws 6.

The platen 14 is attached to the bottom of the strongback 2, which allows for a steady and well distributed downward force on the top of the thermoplastic pultrusion die system 300 when the ball screws 6 are actuated downward by the servo motors 4. The servo motors 4 are controlled by a CNC control system that command(s) a given position through sophisticated motion control including, but not limited to, commanded acceleration, deceleration, and soft reversal of torque and direction. When the downward force of the platen 14 depresses the silicone seals 40, there is additional resistance of the thermoplastic tape material, which is not shown in FIG. 1B for clarity, but would be in the entire die cavity gap 47. Since the silicone seals 40 are designed for high temperature and have good recovery after compression, the die cavity gap 47 remains sealed on the sides through the entire actuation cycle from maximum gap to minimum gap. The silicone seals 40 can stretch or be compressed up to 800% without loosing its/their elasticity.

Although the maximum die cavity gap 47 can be set by the bolts (in bolt holds 45), a more preferred method is the use of the load cells 8 at the end of ball screws 6 to give a measure of calibrated die pressure. If the weight of the die top 31 is great, it may be necessary in some cases to attach the die top 31 to the platen 14 and the strongback 2. In this way, absolute minimum material pressure can be achieved when the ball screws 6 are actuated upward. The goal will be to adjust the die cavity gap 47 to the proper height to achieve continuous pultrusion of thermoplastic composite laminates, and when the situation calls for it, the system 300 can actively alternate between pultrusion and cycling the die cavity gap 47, as well be described in more detail below.

Although the lower support 18 is shown as being fixed and secured to ground/not deflectable, in one or more alternative embodiments, the support 18 is similar to the platen 14 and the strongback 2. Thus, in one or more embodiments, the system 300 may include an upper movable die top/platen/strongback and/or a lower movable die top/platen/strongback.

Purposely not shown in FIG. 1B are the heating and cooling systems (they can generally be seen in FIG. 1A), which include a heating zone in the center and generally forward sections of the system 300, top and bottom, and with a cooling section toward the rear, or discharge end of the die, both top and bottom. Multiple coordinated controls may be used to control the system 300. If, for example, the system 300 of FIG. 1B had four ball screws 6 with four servo motors 4, the system 300 would include 4-axes of motion control. With the addition of three pultrusion grippers (See FIG. 1A), the system 300 would include a minimum of a 7-axis CNC system and process. The computer hardware and/or software to interface with this system 300 will be generally described below with respect to the exemplary computer system 550 described below with respect to FIG. 11.

Once the embodiment of FIG. 1A is provided as a system 300, with the CNC motion control, then the control schemes of FIGS. 2, 3, 4, and 5 can be implemented. There are reasons to consider each, which will depend on factors, such as, but not limited to, laminate thickness, laminate density, surface finish required, addition of foreign material (besides thermoplastic tape) including the wide variety of core materials such as, but not limited to, wood, concrete, gypsum, honeycomb, foam, and other foreign materials/cores that can be found in sandwich panel construction.

Figure 2:
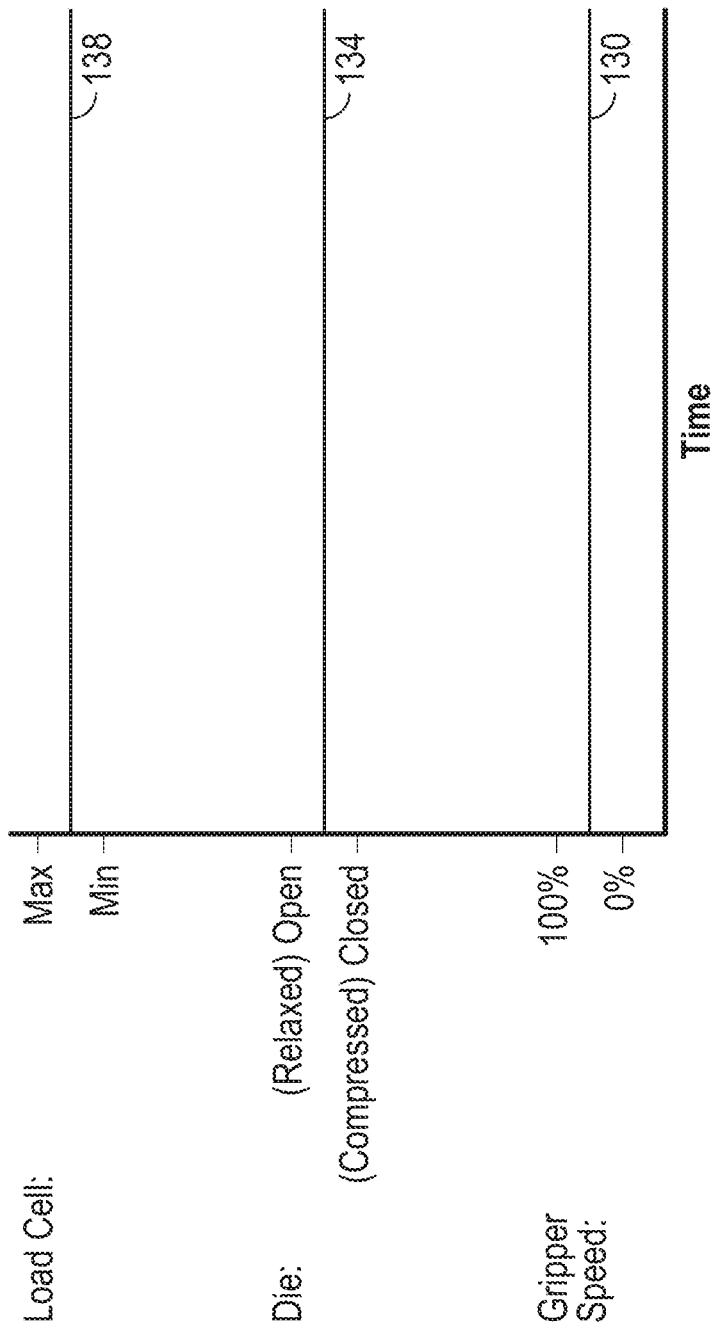
FIG. 2 is a graph showing how the embodiment of the thermoplastic pultrusion die system and method shown in FIG. 1B can operate steady state at some predefined load cell reading, which is a closed loop control and feedback on the opening of the die cavity gap, and synchronized with the pultrusion speed.

FIG. 2 shows the simplest control scheme for the system 300. Three different graphs are shown versus time. The units in time can be any as part of the pultrusion process. As shown in FIG. 2, the grippers 309, 311, 313 are shown running at a consistent speed 130 somewhere between their 100% design speed and 0% speed (stopped). The die cavity gap 47 is shown between some maximum specification gap and some minimum specification gap 134. The load cell reading 138 is showing an effective internal pressure via a constant load cell reading. This is similar to thermoplastic tape pultrusions run consistently with thick parts (0.303 inches in thickness and 32 layers of Polystrand thermoplastic tape). In such a case, the die thickness that was machined was perfect. However, had it not been perfect, the frictional forces would have been too high or the consolidation would have been too low. In cases where the die is not perfectly set to the correct die cavity gap, then the system 300 and method of the present invention can correct such a problem.

In the case of thin laminates, the adjustment of die cavity gap may be mandatory in achieving a perfect pultrusion. FIG. 2 simulates setting the die cavity gap to the perfect thickness, as judged by numerous criteria, as if a solid die was perfectly manufactured. The system 300 of the present invention is critical in reducing the costs of manufacturing and trial and error in making the perfect die. Accordingly, FIG. 2 represents a system that duplicates a perfect die cavity gap, and has an important other benefit. In start-up, it is necessary to open the cavity somewhat to make it easier to string-up the material at the start. Also, if splices ever are needed such as at the end of a pultrusion run, the pultrusion die system 300 can be slightly opened temporarily. If an anomaly occurs, the control system would catch the problem (such as the tape breaking at the inlet and suddenly having less volume). In this case, the load cell 8 on the die top 31 would catch a drop in consolidation pressures.

Figure 3:
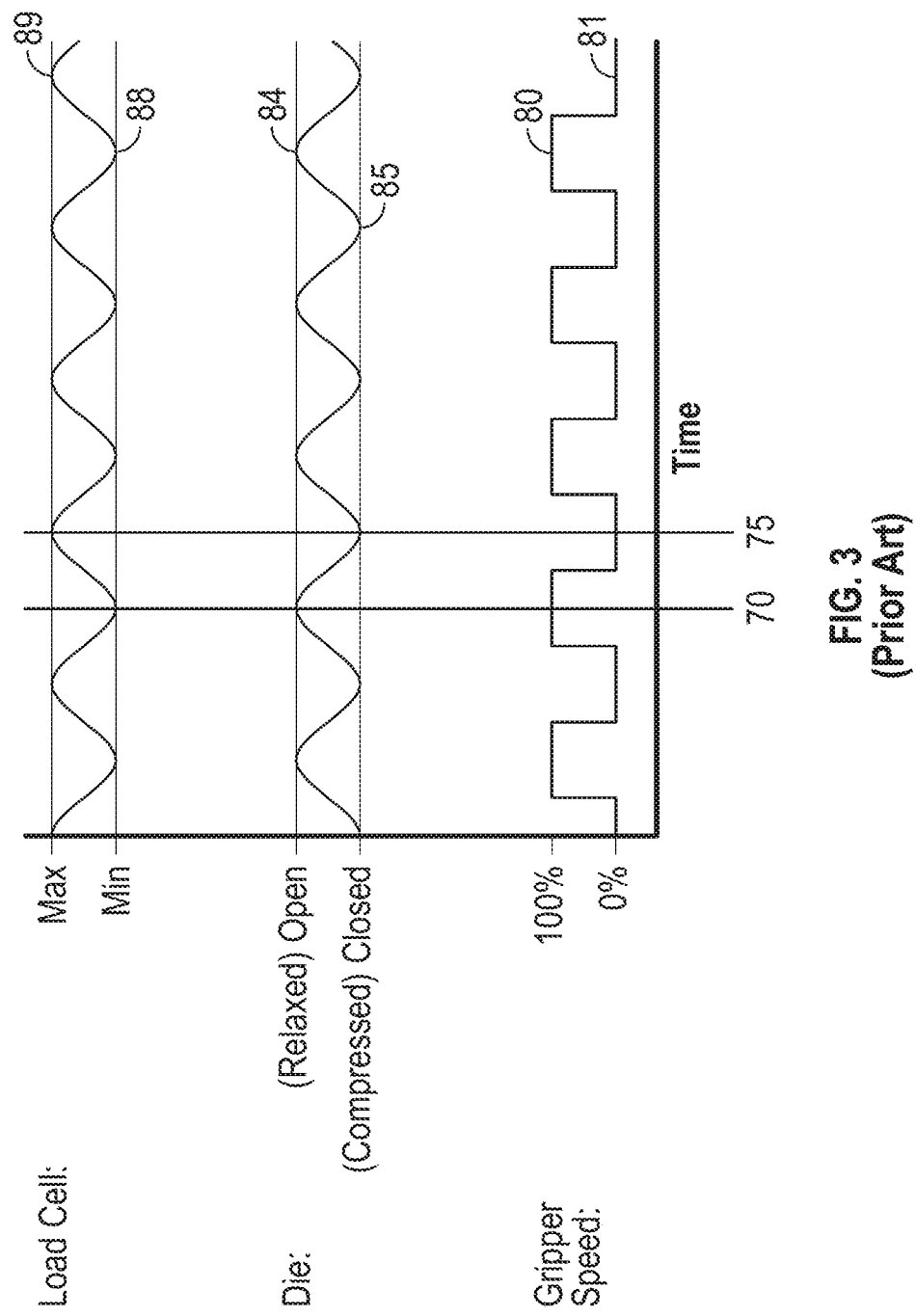
FIG. 3 is a graph similar to FIG. 2 in which a further embodiment is possible with the thermoplastic pultrusion die system and method. In this embodiment, the thermoplastic pultrusion die system and method allow for temporary halting of the gripper speed while high-compression forces are temporarily applied to the part.

FIG. 3 shows a variation in software control that can be provided with the identical system described with respect to FIG. 1. With thin laminates, it is sometimes necessary to prevent the sloughing of off-axis tapes, such as +/−30 degrees, +/−45 degrees, or 90 degrees. This sloughing is caused by tight die cavity gaps, minimum material and high frictional forces. The graph of FIG. 3 is similar to FIG. 2. The term "pull-pression" is coined for the combination of pultrusion and compression (molding). It should be noted that two different moments in time are shown with the vertical lines 70 and 75.

Line 70 in FIG. 3 shows a point in time where the gripper 309, 311, 313 is pulling at 100% of design speed, indicated by 80. It is here where the die cavity gap 47 is most open or relaxed, as indicated by the peak in the curve 84. It so happens that the load cells 8 reading the die pressure will be at their lowest point 88.

As the grippers 309, 311, 313 move in a cycle, new raw material 304 is being pulled into the entrance of the pultrusion die system 300 and the finished composite part 302 is being pulled from the exit of the pultrusion die system 300. After a discrete unit of time, the grippers 309, 311, 313 suddenly stop and this occurs when the servo actuators apply commanded downward force on the die top 31 and the part is effectively undergoing compression. At this point, the grippers 309, 311, 313 are stopped at 0% speed 81 and the die cavity is compressed at cycle point 85 and the load cell(s) 8 indicate maximum compression 89.

It is at this point that the cycle repeats itself. At intervals, the material is in a relaxed condition and pulled into the pultrusion die system 300, then compressed at no speed, and then relaxed at 100% speed, and the process repeats itself. The pultrusion die system 300 starts out cold at the front (or partially heated below the melt point of the thermoplastic matrix). As the material moves its way down the pultrusion die system 300, it encounters a hot zone designed to completely melt and consolidate the part under pressure, and then further down towards the die exit, the material is chilled or cooled and it is finished with its consolidation and eventually exits the cooled die as a finished section.

Figure 4:
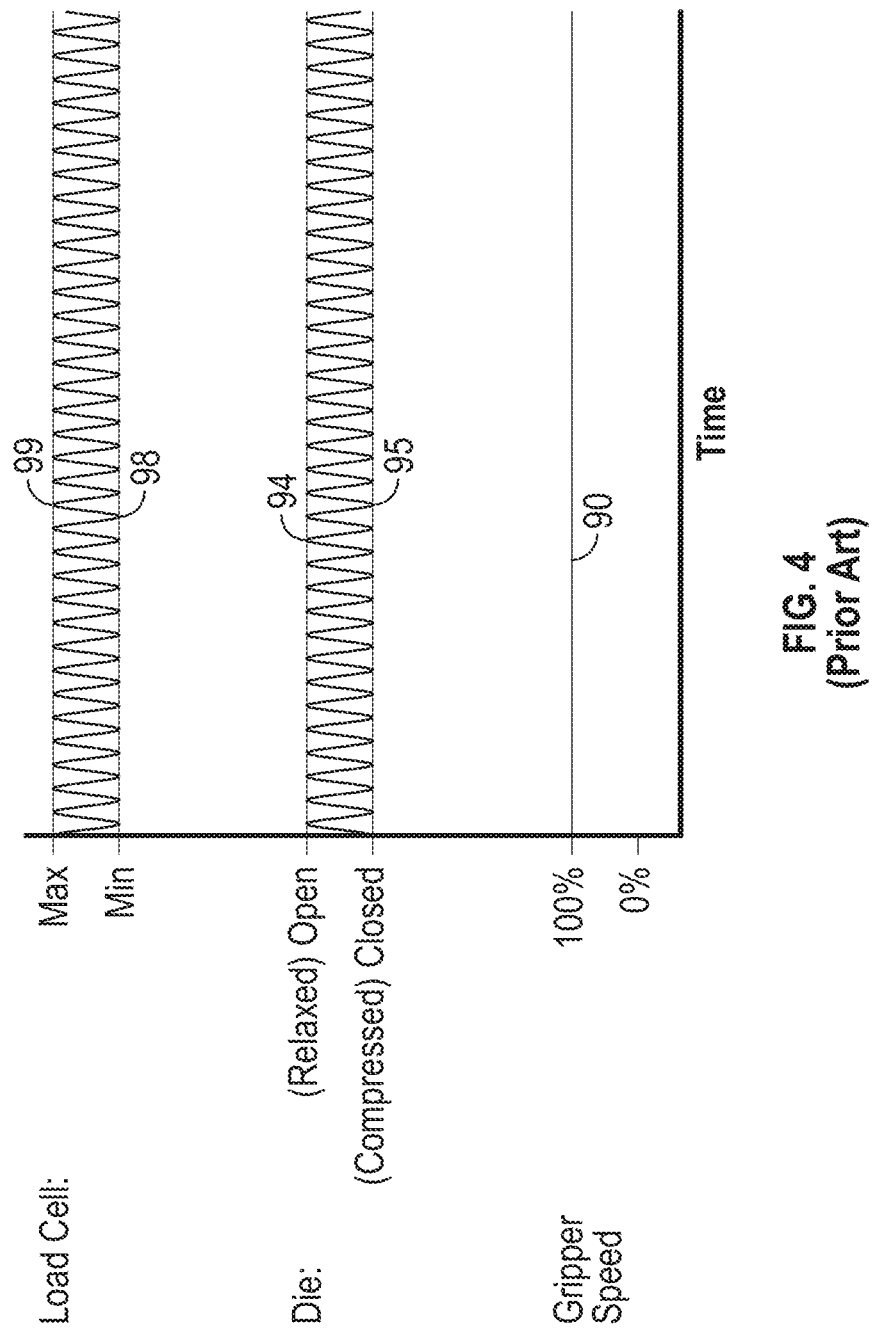
FIG. 4 is a graph similar to FIG. 3, except that in this embodiment of the thermoplastic pultrusion die system and method a rapid servo control and high frequency of the change in die cavity gap occurs in a manner that does not require the grippers to be stopped.

FIG. 4 is similar to FIG. 3. It should be noted that, in FIG. 4, there are peak load cell readings 99 associated with the most compressed die locations 95. Likewise, there are minimum load cell readings 98 that correspond to relaxed positions on the die gap 94. Shown in FIG. 4 is a very high cyclic alternate actuation of servo controls to achieve this rapid movement and the numbers could amount to several per second, with the limitations of the actuation system and the ball screw travel. In this case, a small fraction of time allows the pultrusion speed to stay constant and follow steady pultrusion speed. Using the system 300 and method, trial and error can be used to determine the optimum control sequence.

Figure 5:
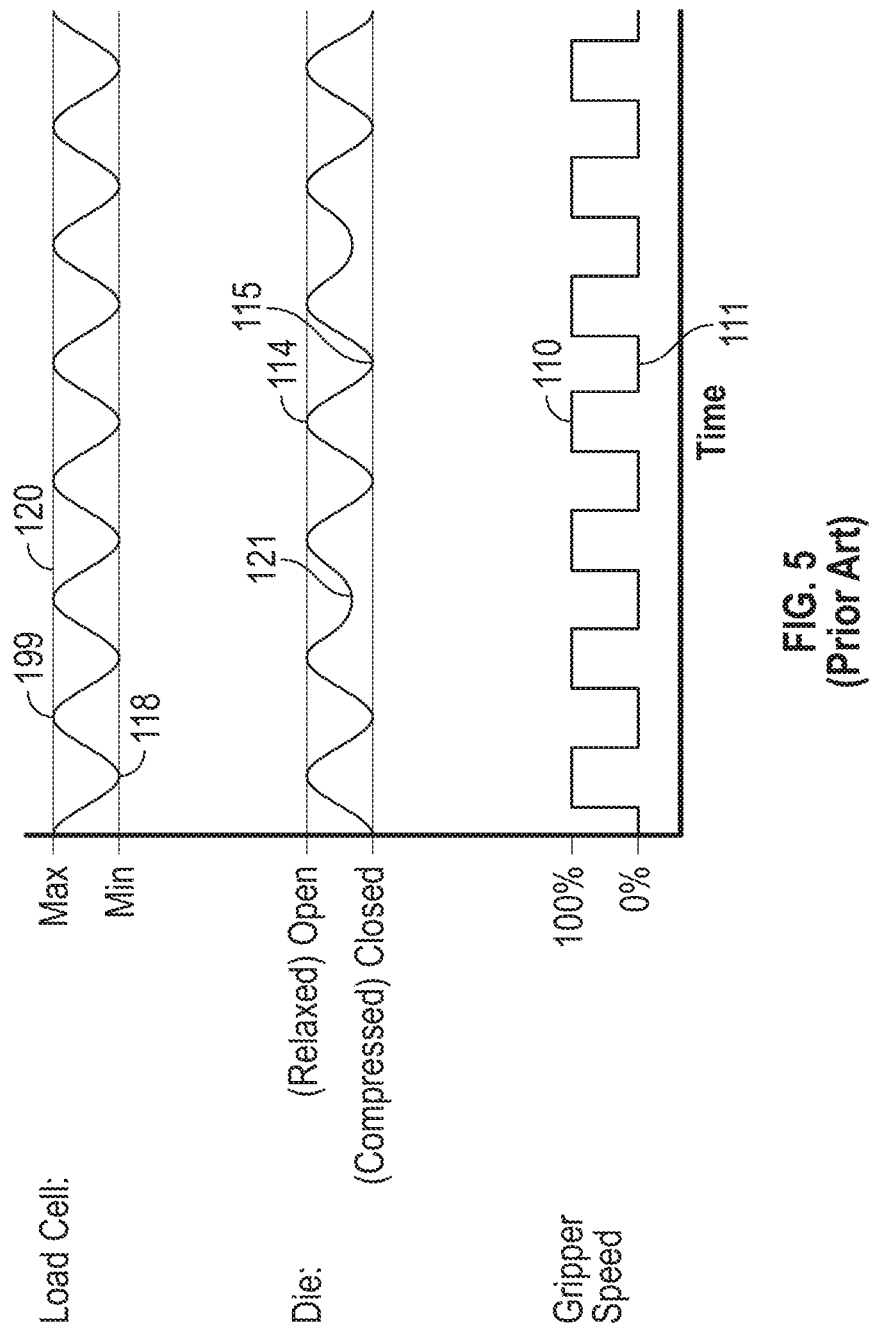
FIG. 5 is a graph similar to FIG. 3, and shows how the thermoplastic pultrusion die system and method could react to an anomaly such as a splice, a knot in a wood core, or other disruption causing excessive die pressures.

FIG. 5 is similar to FIG. 3, except in FIG. 5 the control interrupts a compression event 121 when some interference (e.g., a thicker core or skin material) has entered the pultrusion die system 300 and now the full compressed location 115 of the die cavity cannot be achieved as the load cell reading alarms the control system that maximum die pressure has occurred early in the compression cycle. In this case, the actuators will not complete the compression until the load has returned to an acceptable level.

Figure 6:
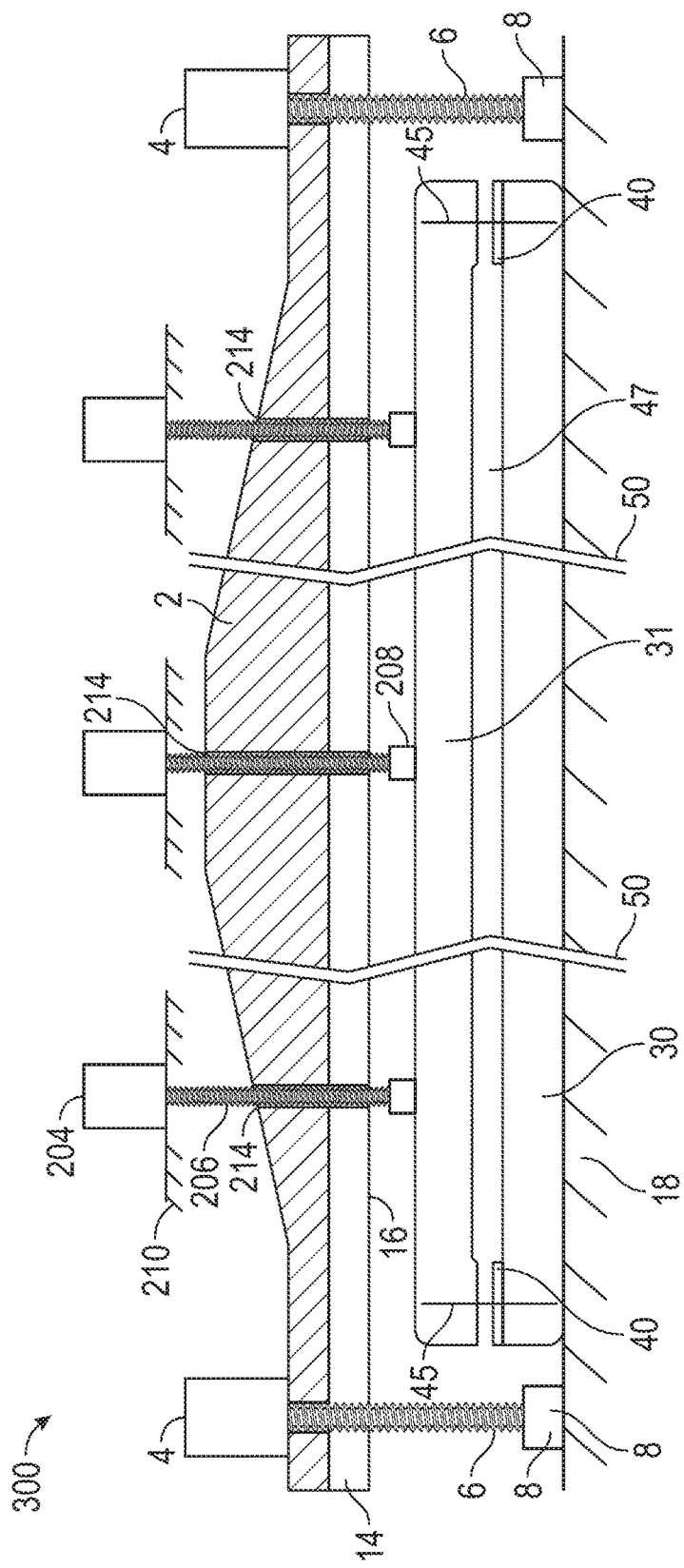
FIG. 6 is a side elevation view similar to FIG. 1B of an alternative embodiment of a thermoplastic pultrusion die system and method with multiple CNC type servo actuators and load cells installed over a very wide die top, a very wide plate, and a very wide strongback.

In many large pultrusion die systems, producing panels continuously and up to as much as 14 feet in width, it is difficult to pressure the material and keep the die surfaces at the same gap in the middle of the pultrusion die system 300 as the edges. In this case, as shown in FIG. 6, the lines 50 are break lines and indicate a much wider die than shown. A sample of an adjunct ball screw 206, load cell 208, and servo motor 204 are shown. This is shown inside a hole 214 which has been placed in the strongback, 2 and the plate 14. For a very wide pultrusion die system 300, there may be several of these placed every 1, 2, 3, or 4 feet (or other distance) apart across the width of the pultrusion die system 300 and these are there to achieve the same purpose as elements 4, 6, and 8 in FIG. 6. These multiple actuators could allow for controlling die cavity gaps in the center of a wide, flat die, in which any pressure would want to slightly open up the gap, due to hoop stress forces. There is a need for active CNC control of the die cavity gap 47 over the entire panel width, and this will be especially important in thin and wide thermoplastic composites manufactured from the tapes described herein.

Figure 7:
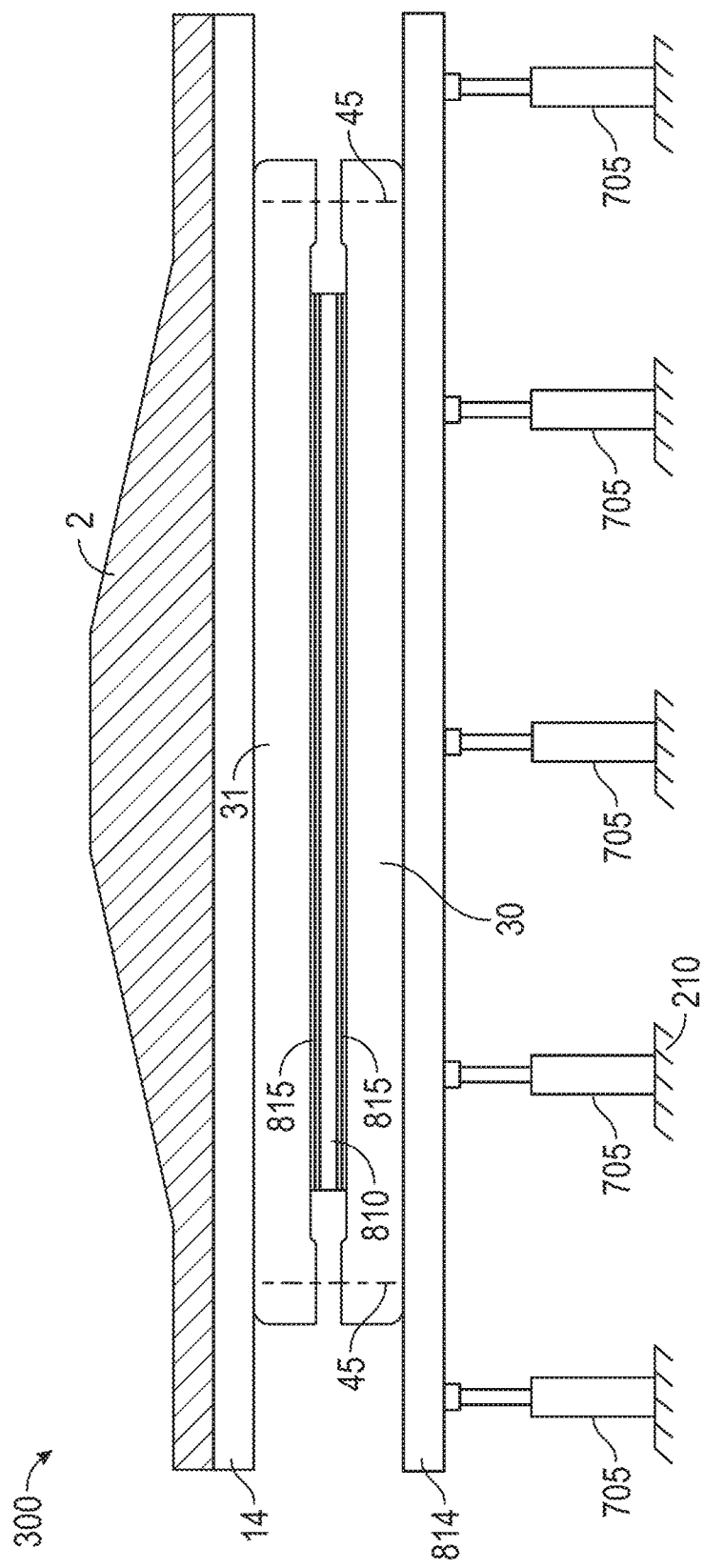
FIG. 7 is a side elevation view similar to FIG. 6 of an alternative embodiment of a thermoplastic pultrusion die system and method, except that the CNC motors and actuators have been replaced with servo CNC hydraulic cylinders and a sandwich panel is shown.

FIG. 7 is a side elevation view similar to FIG. 6 of an alternative embodiment of a thermoplastic pultrusion die system and method, except that the CNC motors and actuators have been replaced with servo CNC hydraulic cylinders 705. Also shown is a sandwich panel in a compressed state, with skins 815 and core 810, in the compressed state as if the full design pressure had been applied through the cylinders 705.

The servo-controlled hydraulic cylinders 705 can alternately close and open the die cavity. When closing, the die cavity can move to a position in which a given pressure is applied to the composite materials, which if, for example, a 100 psi pressure is required and if cylinder(s) 705 were incorporated into a centers-of-equal area, then one square foot, or 144 square inches, requiring 100 psi, would mean a 4 inch diameter cylinder 705 would operate at 1146.5 psi operating pressure. In other words, a single 4-inch cylinder 705 has 12.56 square inches of area, and at 1146.5 psi will deliver 14400 lbs., which is exactly 100 psi of laminate die pressure over one square foot. Further to FIG. 7, the hydraulic cylinders 705 are intended to supply force at the centers-of-equal area. As indicated above, the strong-back 2 supports the upper platen 14, wherein the lower platen 814 has hydraulic cylinders 705 pressing on same and reacted by the ground 210. The die top 31 and die bottom 30 are shown in a compressed state, and as shown there is no need for bolts 45 to attach to the die upper and lower sections.

Figure 8:
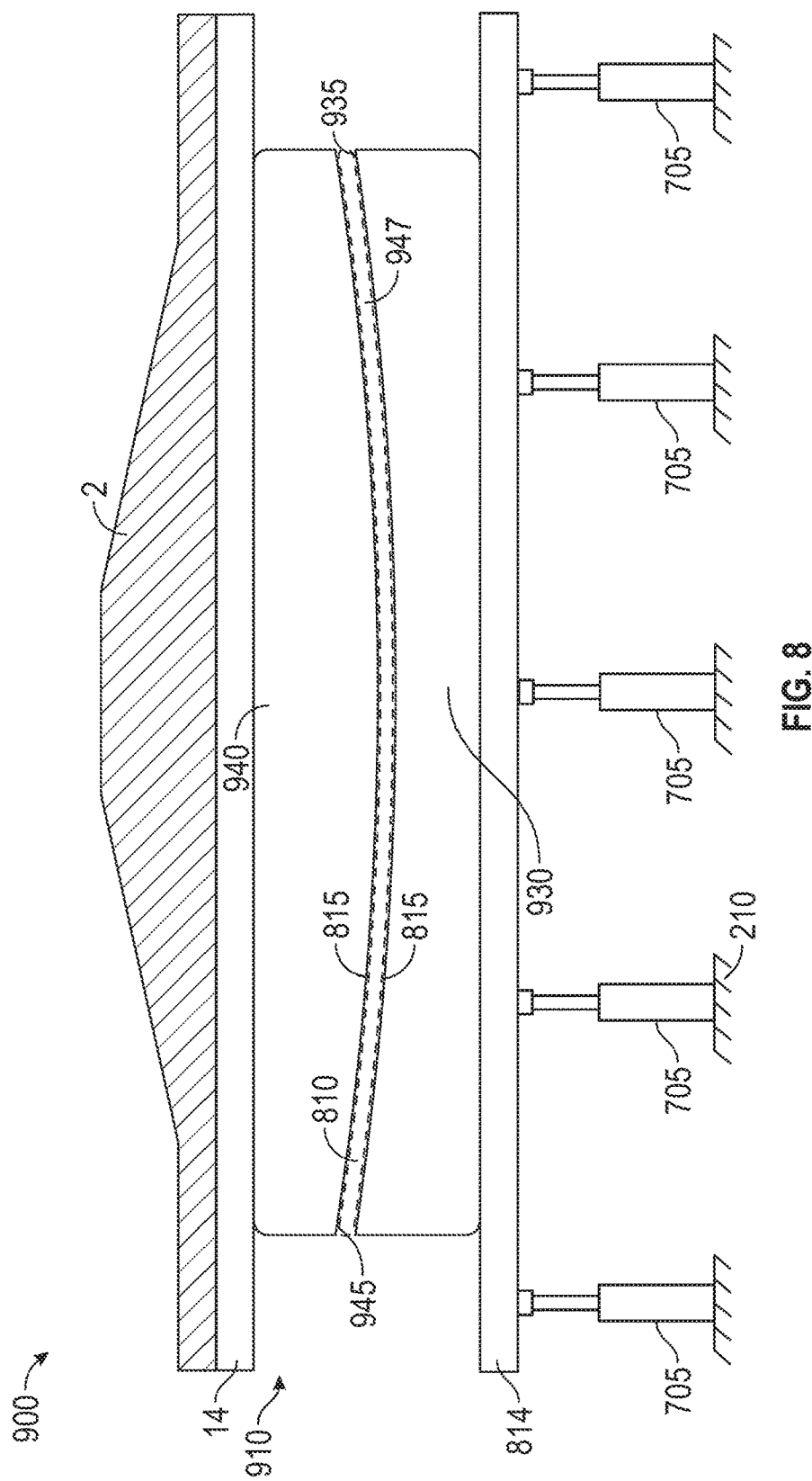
FIG. 8 is a side elevation view similar to FIG. 7 of a further embodiment of a thermoplastic pultrusion die system and method, except that the interior of the die is spherically curved.

FIG. 8 is a side elevation view similar to FIG. 7 of an alternative embodiment of a thermoplastic pultrusion die system 900 and method. The view of thermoplastic pultrusion die system 900 in FIG. 8 is of the exit of the die system 900, but a side view would show the same spherical shape (i.e., die system 900 has interior spherical curve in both longitudinal and lateral directions of die system 900, which manifests itself as an arc line when viewed, as in the case of FIG. 8 at just one edge of the spherical die) and, thus, look similar to that shown in FIG. 8. The above description and drawings of the thermoplastic pultrusion die systems and methods with respect to FIGS. 1-7 are incorporated herein and like elements are shown with like reference numbers.

Figure 9:
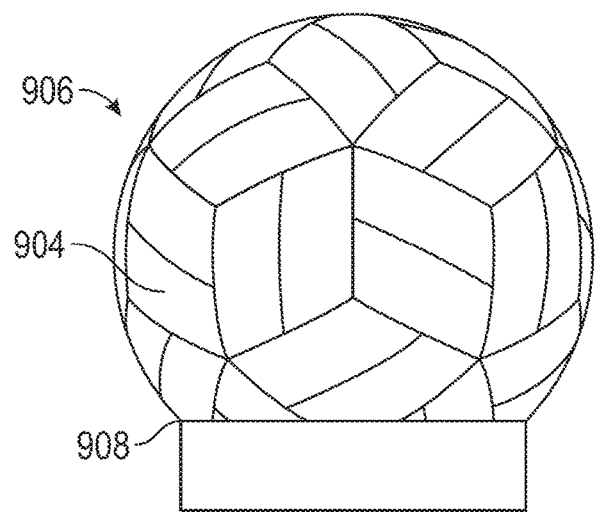
FIG. 9 is a perspective view of an embodiment of a rhombic triacontahedron composite radome.
Figure 10A:
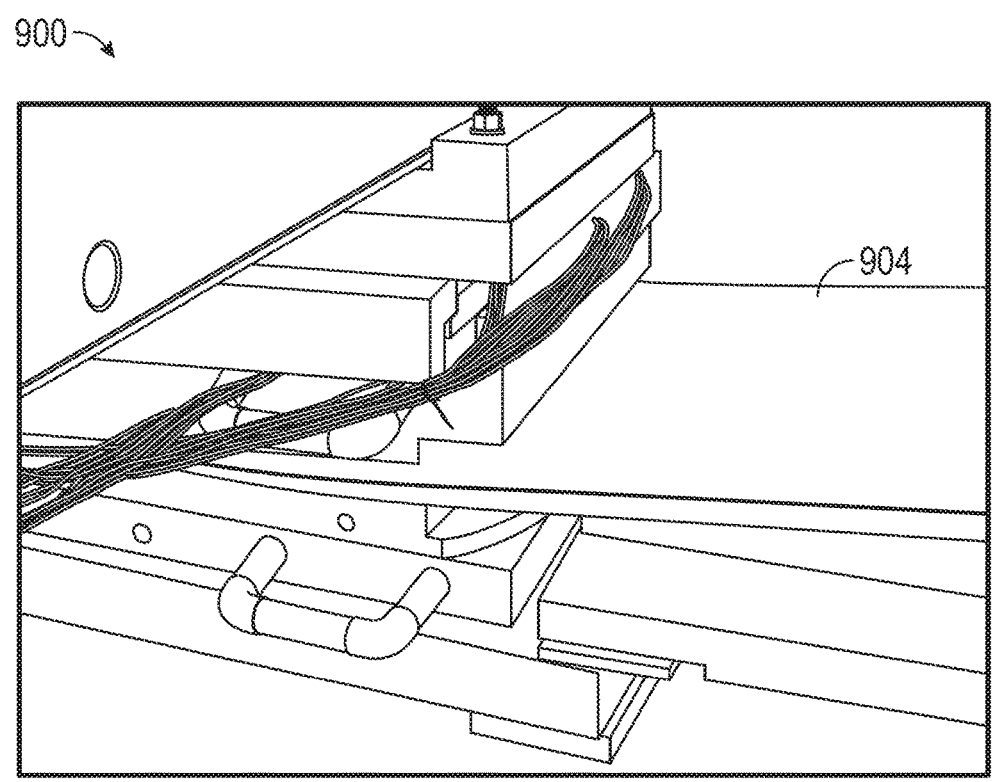
FIGS. 10A-10E are perspective views of different stages of spherical thermoplastic composite sandwich panels processed in a small spherical die similar to that as shown in FIG. 8 and exiting the die along the defined spherical path into curved spherical composite sandwich panels using the thermoplastic pultrusion die system of FIG. 8.
Figure 10B:
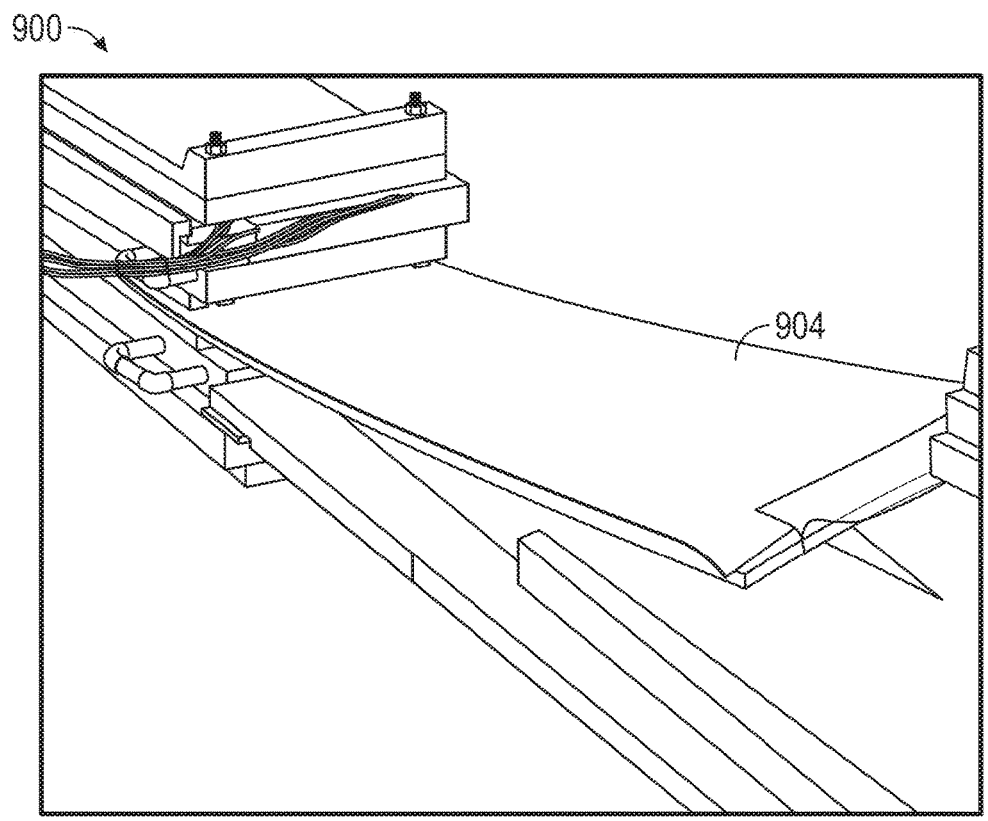
Figure 10C:
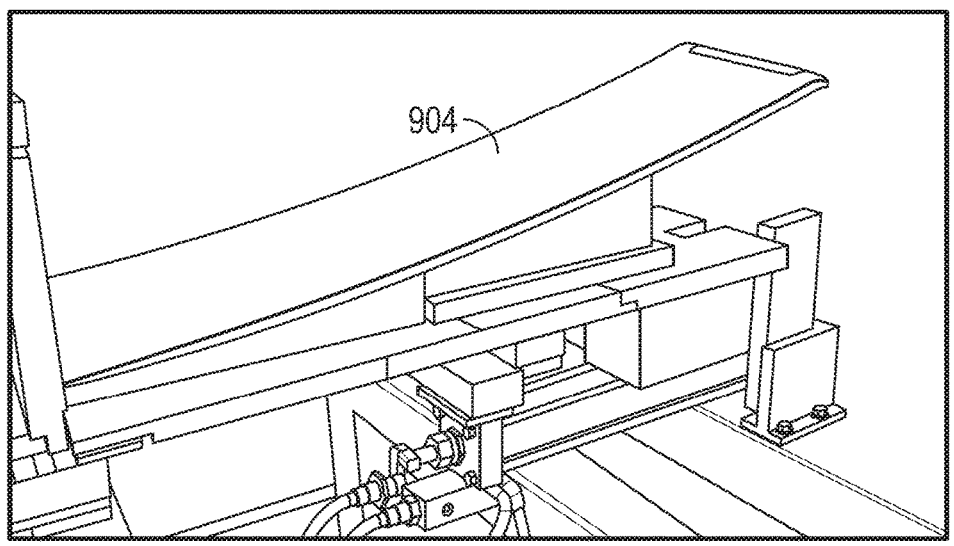
Figure 10D:
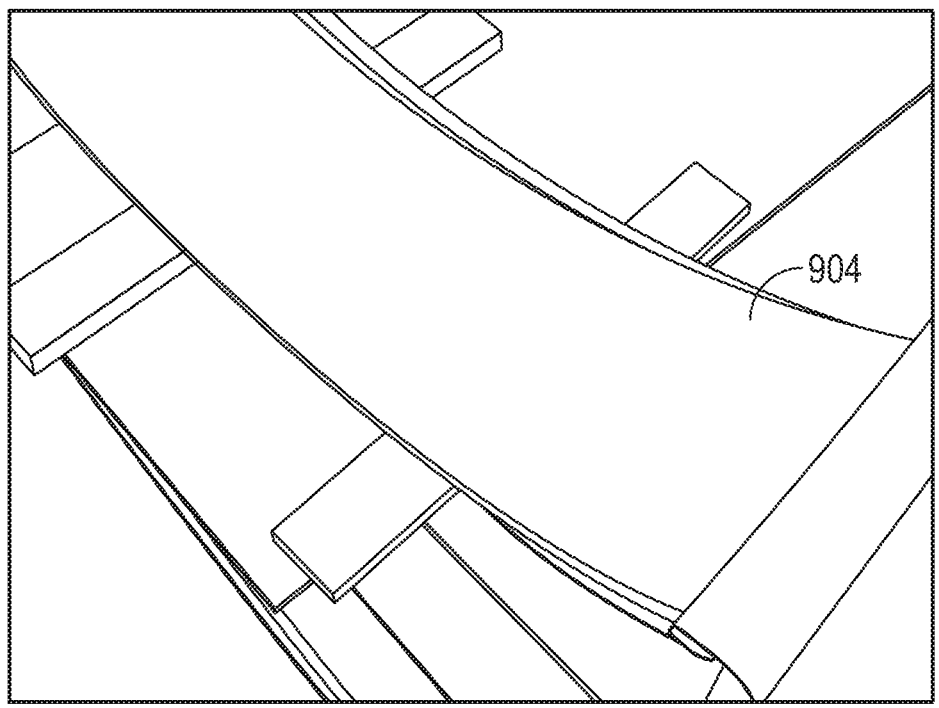
Figure 10E:
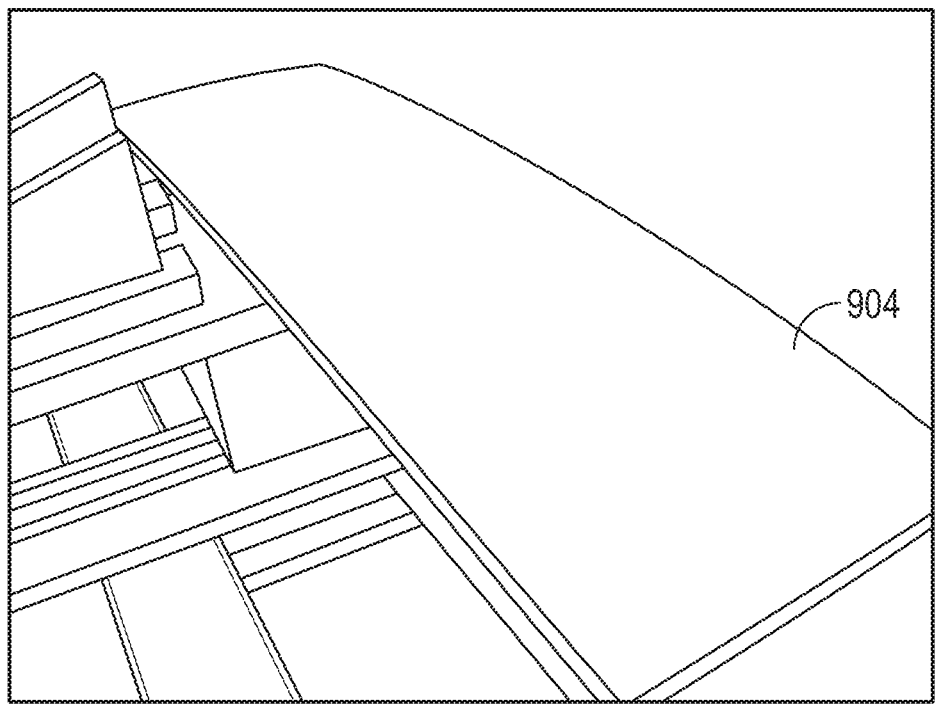

In the embodiment shown, the thermoplastic pultrusion die system 900 and method are used to sequentially form from the input into the processing die of flat thermoplastic composite sandwich panel material into 100% spherical-curved sandwich panels 904 that exit the processing die, which are assembled together to form a rhombic triacontahedron composite radome 906 such as that shown in FIG. 9 to protect a vast number of radar installations, including military radar. The flat sandwich panels include a foam core with top and bottom skins and as an option, 3-dimensional fibers transit from one skin to the other, through the foam. In alternative embodiments or implementations, the thermoplastic pultrusion die system 900 and method are used to post mold sandwich panels for other applications, including panels of different spherical diameters and different cylindrical shapes, as well as complex curvatures.

The thermoplastic pultrusion die system 900 includes a spherically curved die 910 in the shape of the defined spherical diameter of rhombic triacontahedron radome panels 906. The die 910 includes a die bottom 930 with a curved, spherical, concave top surface 935 and die top 940 with a curved, spherical, convex bottom surface 945. Together, the curved, concave top surface 935 of the die bottom 930 and the curved, convex bottom surface 945 of the die top 940 form a curved spherical die cavity gap 947.

As shown in FIGS. 10A-10D, during the efficient in-line thermoplastic pultrusion method, the flat sandwich composite panels are processed into continuous curved, spherical sandwich composite panel parts 904. The curved sandwich composite panel parts 904 exiting the die system 900 climb according to the curvature being formed. In the embodiment shown, the curved sandwich composite panel parts 904 are of the same length, size, and curvature and are assembled together to make the radome 906 to protect military radar. In alternative embodiments, it may be desirable to make curved configurations/structures where one of more of the curved panels have a different curvature, length, and/or size. In a still further embodiment, the convex and concave surfaces and die members are reversed, such that the spherical resultant panel exiting the die members curves in a downward direction.

With reference to FIG. 9, the rhombic triacontahedron composite radome 906 is a sandwich panel radome of the A-Sandwich variety wherein the thin skins on each side are a thermoplastic resin matrix with glass encapsulating a foam core, and the combination of the thin skins and the foam core are radio frequency (RF) transparent and sized to be approximately ¼ the wavelength of the radar frequency of the military radar being protected. The radome 906 is made of spherical panels 904 and is of the order of 30 feet to 60 feet in diameter, but clearly could be any diameter from 5 feet to 200 feet in dimension. Because the radome 906 is a rhombic tricontrahedron radome, there is only one-sized panel to make the sphere. Because the radome 906 is a rhombic triacontahedron radome, there is only one-sized panel to make the sphere, excluding the truncated panels that attach to a mounting ring or foundation, at 908, and each said truncated panel is made from a larger, aforementioned one-sized panel.

Hydrophobic films or coatings/paints can be applied to the outside of the radome sandwich part 904 prior to assembly to resist weathering and to keep the radome 906 clean and free of water droplets, in order to affect the superior transmission capability of the radar.

To house the radome 906, there is a truncation of the dome, at approximately 85% of the height/diameter of the radome 906, where a mounting ring 908 is located and the radome 906 bolts, or is fastened, to the mounting ring 908 for structural stiffness and rigidity, and here there is a set of different shaped panels, but each formed from the same base-singular panel 904, to create the spherical radome 906. In an alternative embodiment, the radome 906 is made of panels 904 having a few different configurations of a multitude of geodesic designs involving radome shapes, pentagons, hexagons, radome-shapes, orange-peel shapes, and the like.

Figure 11:
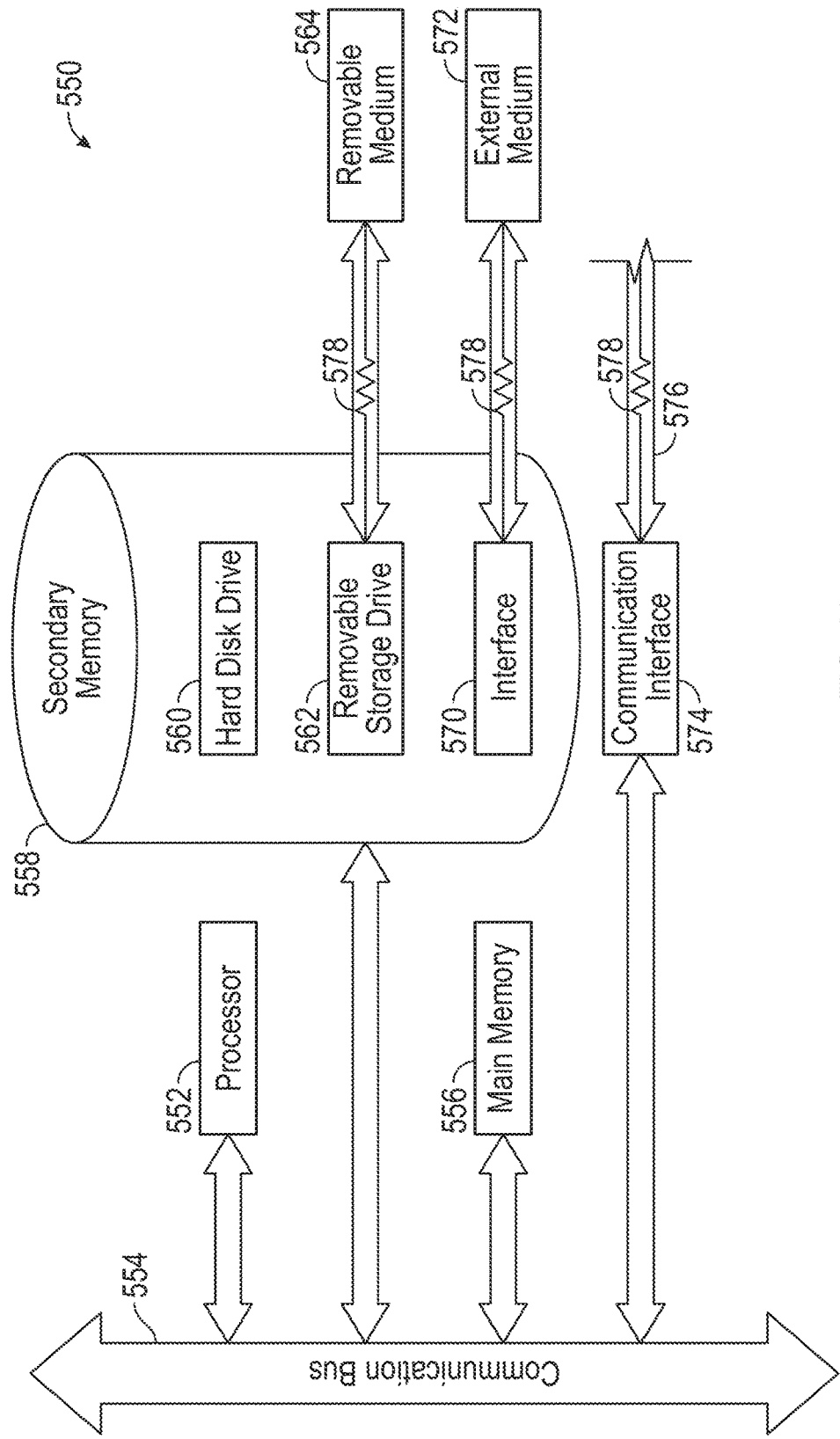
FIG. 11 is a block diagram illustrating an example computer system that may be used in connection with various embodiments described herein.

FIG. 11 is a block diagram illustrating an example computer system 550 that may be used in connection with various embodiments described herein. For example, the computer system 550 may be used in conjunction with the computer system(s), computer(s), control(s), controller(s), control system (e.g., software, and/or hardware). However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Figure 12:
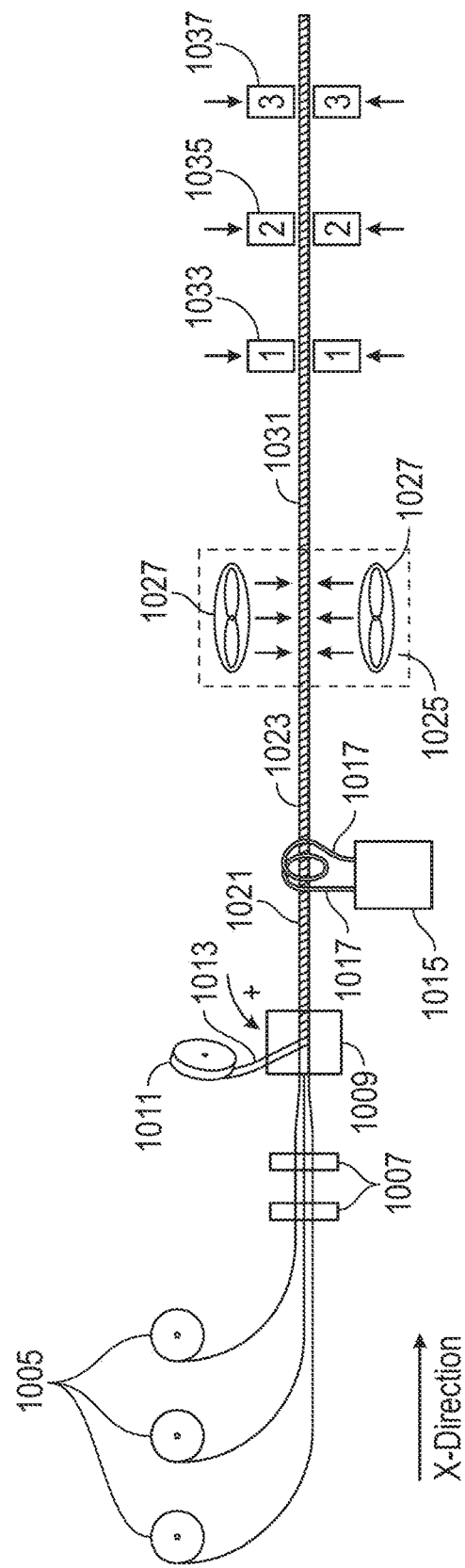
FIG. 12 is a diagram of an embodiment of a thermoplastic composite tubular lineal forming system and process flow diagram illustrating the various elements of the robotic process as the material flows in the X-direction (from left to right).
Figure 13A:
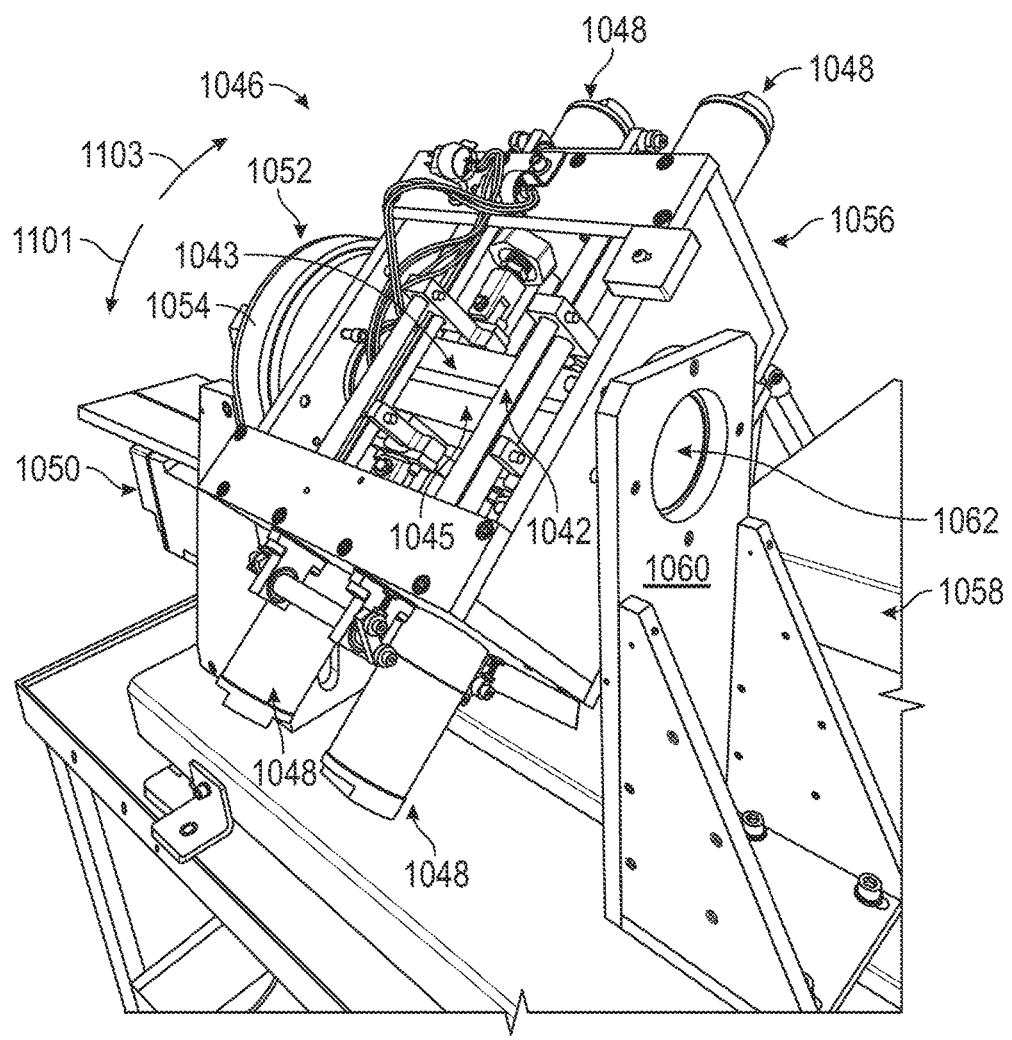
FIG. 13A is a perspective view of an embodiment of a die assembly that replaces the cooling fan section of FIG. 12.

With reference to FIGS. 12-14, an embodiment of a long thermoplastic composite tubular lineal forming system 100 and method will be described.

Thermoplastic composite processing can be accomplished continuously by incrementally applying die pressure on preformed and prepreg material while the part is not moving through the machine, then sequentially altering between a release of the die surfaces/and movement-to-open-die-surfaces, then a movement in a controlled fashion an incremental step forward, followed again by zero line speed and a clamping force applied.

FIG. 3 shows clamping and line speed alternating as the continuous process proceeds. The part then moves from a heated die at predetermined temperatures to a chilled die also at predetermined temperatures, and then when exiting the chilled die the part is fully consolidated.

Replacing the die, which initially is flat, as shown and described with respect to FIGS. 1B, 6, and 7, with a spherical or cylindrical die, as shown and described with respect to FIG. 8, one can make curved shapes continuously. A 32-foot diameter radome with thermoplastic sandwich panels manufactured in the process system described above was successfully manufactured and installed.

Applicant has recognized that a need exists to manufacture a complex shape that is tubular and round and not just flat and solid. Applicant has also recognized that a need exists to produce very long tubular thermoplastic composite lineals from the continuous system the Applicant has developed.

Similar to the embodiments shown herein and described above, where a thermoplastic composite prepreg or the like is sequentially consolidated at a "melt" temperature as the part is pulled forward, the thermoplastic composite tubular lineal forming system 1000 and method includes a thermoplastic composite prepreg or the like that is sequentially consolidated at a "melt" temperature as the part is pulled forward, and then sequentially cooled on the downstream side once consolidation at high temperature has been achieved.

Applicant has disclosed three alternatives to the processing of the tubular lineals and all have advantages or features that differ from the other alternatives, and these will become apparent following the descriptions below.

In FIG. 12, the process flow of a raw material moves in the X-direction, from left to right. The beginning, left, front-end, or upstream part of the system 1000 and process includes pre-pregged composite material shown on creel rolls 1005, which are pulled downstream by grippers 1033, 1035, and/or 1037 in a hand-over-hand arrangement that is robotically programmed. There are only three rolls 1005 shown, but, in alternative embodiments, clearly there can be any number (up to several hundred) that could be possible on the front end of the process.

Note also that the pre-pregged material can be consolidated into thin strips at a pre-pregged facility and shipped in rolls. It could be available in thin wide strips and tape is slit into appropriate widths for tubular processing. Alternatively, the pre-pregged material could be created at one's facility and placed on rolls 1005, or the pre-pregged material could be pre-pregged upstream on the line shown in FIG. 12 and never placed on rolls 1005.

Directly downstream, in the X-direction from the rolls 1005, the forming and guide bushings 1007, which are machined plates that assist in circumferentially spacing the pre-pregged material in the correct location around the circumference of the tube, are shown. Shown are two bushings 1007, but in alternative embodiments, there could be large numbers of these plates that guide and direct the pre-pregged material in the correct slots. Each downstream slotted bushing 1007 could have closer and closer slotting to the actual final position on the tube outside surface making the guidance tooling a full-proof ply-positioning system. Ideally, the pre-pregged material is sized to give the correct volume fraction of pre-pregged material for each layer of the wall-thickness build-up on the tubular lineal. This means the first layer of plies have less volume then the next, and so-on until the last layer of plies of pre-pregged material have the greatest diameter and, thus, the greatest volume.

Directly downstream of bushings 1007 is a rotational box system 1009 that is robotically controlled to rotate a precise angle according to the pull distance robotically programmed at the pulling grippers 1033, 1035, and/or 1037, or a combination thereof which are pulling a fixed distance. The rotational box system has a CNC motion control motor, a sprocket and belt and several hardware elements that are not shown in FIG. 12 for clarity. There is shown in FIG. 12 an arrow with a "plus" sign to indicate this rotational box system can rotate in the clockwise direction looking downstream.

Connected to rotational box system 1009 are mechanical arms that hold the release material spool 1011 with hardware that can adjust the angle of payout. The tensioning system and connecting arm are not shown for clarity, but as stated earlier the rotational box system, when rotated carries the release material spool 1011 around the pre-pregged material. Preferably, the angle is 45-degrees, but, in alternative embodiments, the angle may vary to give more (or fewer) wraps per given distance of pull. The release material being wrapped is indicated by 1013 in FIG. 12. The release material 1013 could be any suitable flexible material, but in this embodiment it should be assumed that release material 1013 is a polyimide film such as that provided by DuPont with the trade-name Kapton. This is because Kapton can be used at high temperatures such as required by PEK, PEKK, and the like.

In regard to the release material 1013, there are versions available that contract (or shrink) when subjected to elevated temperatures. This feature provides a benefit that an effective pressure can be exerted on the pre-pregged material when heated. Note, there are versions of this tape that also include a release film so that there is no adherence to the finished thermoplastic composite tube, after full processing. The release material 1013 is capable of contracting, or shrinking from 20% to 40% of its steady state size when subjected to elevated temperatures. In an alternative embodiment, the release material 1013 does not shrink, and, thus, the die sets are required to consolidate the pre-pregged material. In both cases, a winding mechanism (to wrap release material 1013) is required. If two or more wraps of fiber/prepregged material were required at a +/−45 degree angle, this could be achieved by adding two or more additional rotation box systems upstream of the release material 1013, and the boxes could have prepregged material wrapping +45 degrees on one at −45 degrees on the other, before arriving at the location of the release material. It should be noted that the CNC motor can robotically rotate either clockwise or counterclockwise, so either direction can be programmed.

Directly downstream of the rotational box system 1009 in FIG. 12 is the wrapped pre-pregged material (Both of these are over a fixed steel mandrel not shown. The fixed metallic (steel, aluminum, or the like) mandrel controls the inside diameter of the tubular lineal and is held in place in the area of the bushings 1007.) The combination of the pre-pregged material 1005 and the wrapped release material 1013 is shown as 1021 in FIG. 12.

Directly downstream is an induction heater/welder 1015 with water-cooled coils and loops 1017 that are coiled around the combination of fixed steel mandrel, moveable pre-pregged material 1005, and moveable wrapped release material 1013. The tightness of this wrapped bundle is generally good, but not adequate to consolidate the thermoplastic tubular lineal. With energization of the induction heater/welder 1015, the section of the fixed steel mandrel at the center is very rapidly elevated in temperature. As such the pre-pregged material 1005 is elevated to its melt temperature and the release material 1013 is caused to tighten around the mandrel due to a 20% to 40% contraction in physical length. This effectively puts pressure on the pre-pregged material. Since the induction heater/welder can raise the steel mandrel temperature from 75 degrees F. to 750 degrees F. in a matter of 7 seconds or less, this is an extremely efficient way to heat the pre-pregged material.

Following the X-direction in FIG. 12 the next position for the tubular lineal in the system downstream is the hot, and consolidated part 1023, which may or may not be fully consolidated, depending on many variables (including contracted release material 1013 does not contract an adequate percentage to give high pressure consolidation). As the grippers 1033, 1035, and/or 1037 pull the tubular lineal from the location at 1023 to the region of air-cooling shown in the region 1025, the part 1023 is cooled and "frozen" in its final configuration. Shown in this region 1025 are cooling fans 1027, indicating air cooling although other known means of cooling could be employed. Following this the final consolidated part is pulled downstream through a series of grippers, which optionally could be one, two, or three grippers, as needed. The release material 1013 can be "un-wrapped" automatically, either before reaching gripper number 1033, or after gripper number 1037.

As mentioned in the previous paragraph, at least one variable to the process that may require improved performance is the case wherein the release material does not consolidate to as high a pressure as needed. In this case there is a preferred modification that has proven successful. If the section in FIG. 12 identified as the region 1025 is replaced with the die sets shown in FIGS. 13A and 13B, the consolidation pressures can be achieved and the tubular lineal can be produced with excellent results.

Figure 13B:
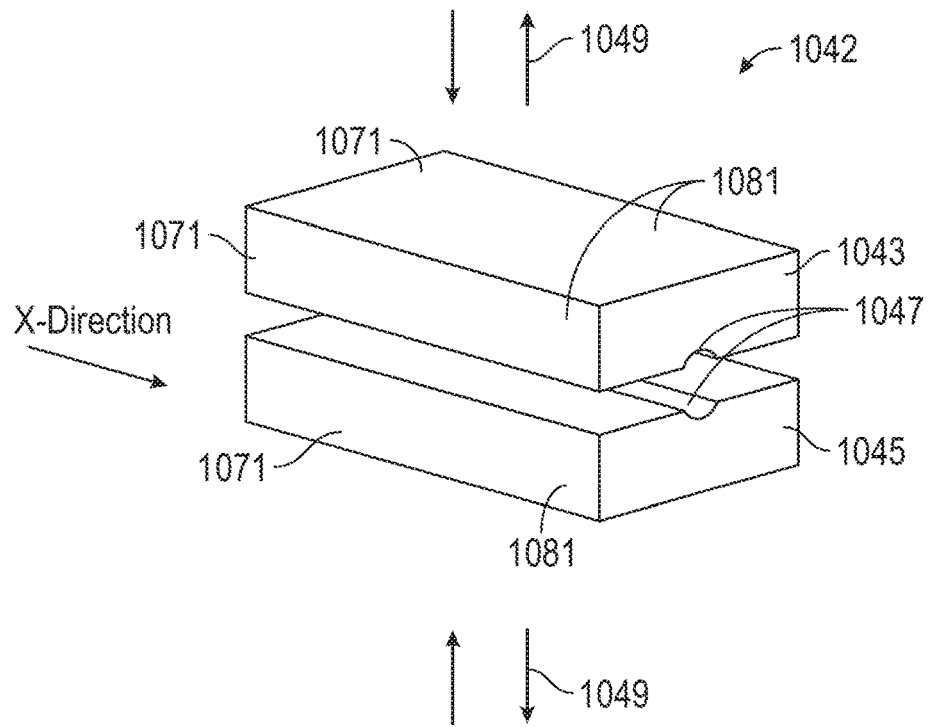
FIG. 13B is a rear perspective view of an embodiment of a die set for the die assembly.
Figure 14A:
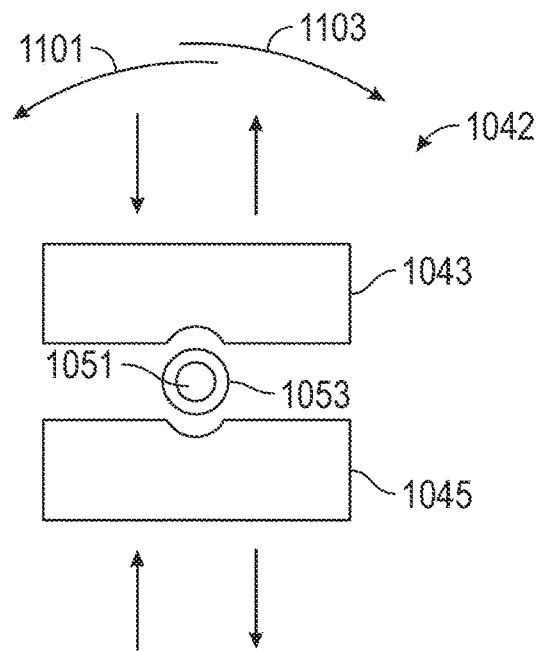
FIGS. 14A, 14B, and 14C are isometric and rear elevational views of the die set of FIG. 13, illustrating three different angular rotations of the die sets with the rotational mechanism omitted for clarity.
Figure 14B:
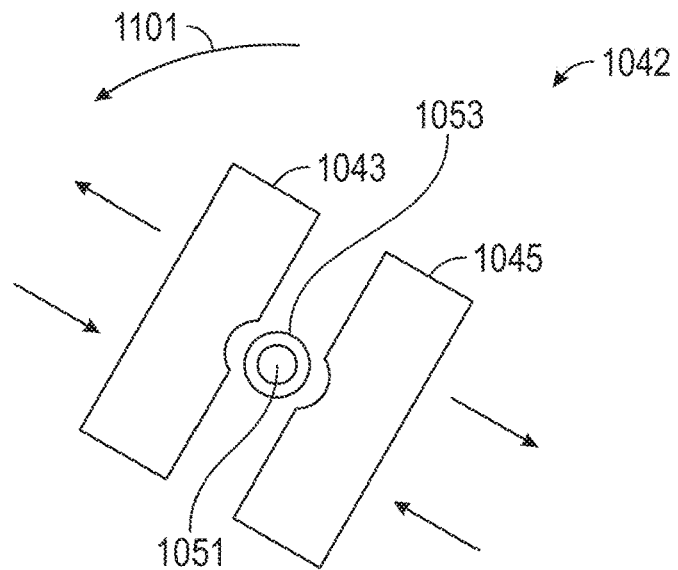
Figure 14C:
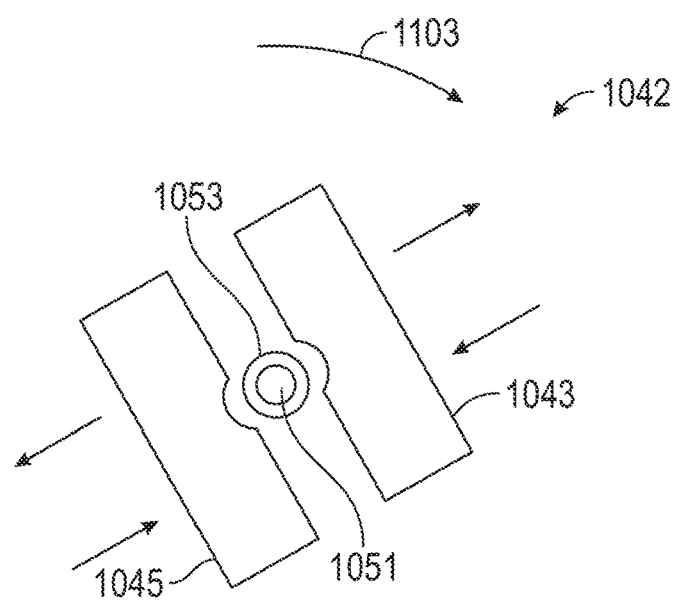

With reference to FIGS. 13A, 13B, 14A, 14B, and 14C, replacing the cooling region 1025 in FIG. 12, a die assembly 1046 imparts rotational motion and linear motion to a die set 1042, which includes upper die 1043 and lower die 1045. The die assembly 1046 includes CNC actuators 1048 and CNC motor 1050 that are positioned with a motion control program to impart rotational motion to the die set 1042 as shown in FIGS. 14A-14C and to extend or retract the CNC actuators 1048 to impart pressure on the tubular lineal 1053 or release the die set 1042 from the tubular lineal 1053. The die assembly 1046 includes a pair of pulleys, including upper pulley 1052, which is coupled to the lower pulley (not shown), which is driven by the CNC motor 1050, via belt 1054 to impart rotational movement to rotating die set frame 1056. The die assembly 1046 includes a support frame 1058 that the rotating die set frame 1056 rotates relative to. The support frame include vertical support brackets 1060, which include respective holes 1062 that the tubular lineal 1053 moves through and the stationary steel mandrel 1051 extends through.

With reference FIG. 13B, the die set 1042 is computer controlled and actuates both closed and opened as the arrows 1049 show and this is identical to that described above with respect to FIGS. 1 through 8. The arrow indicates the pulling direction in X-direction. The upstream section of both the upper die 1043 and lower die 1045 show a region identified by 1071. This region 1071 is the hot section of each die, having installed cartridge heaters (not shown). The aft sections of both dies have a cool region shown as 1081 and the cooling means is also not shown. These dies 1043, 1045 are robotically positioned shut via the CNC actuators 1048 around the tubular thermoplastic lineal 1053 at zero line speed and then unclamped away from the tubular thermoplastic lineal 1053 for advancement by the gripper mechanisms 1033, 1035, and/or 1037. This again is described earlier in the disclosure describing FIGS. 1-8, which is incorporated herein.

Figure 14D:
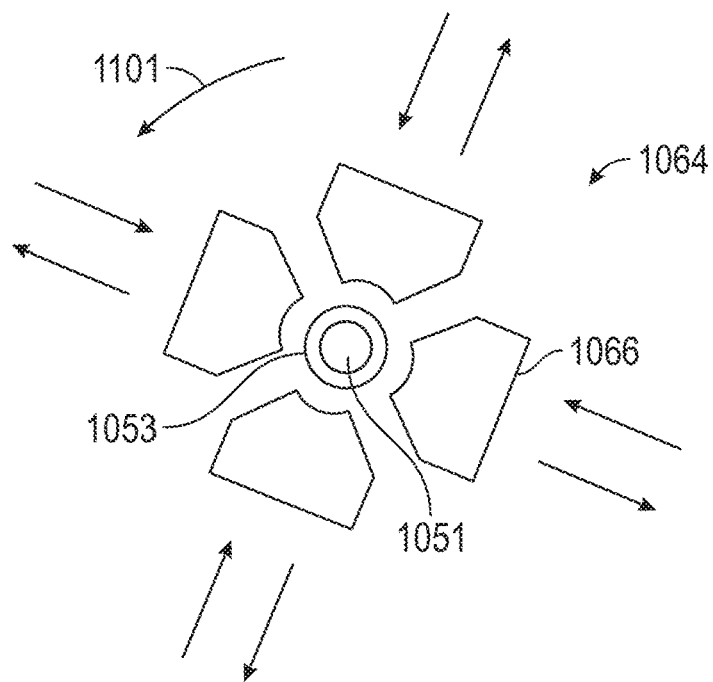
FIGS. 14D and 14E are rear elevational views of an alternative embodiment of a die set including four die plates/members.
Figure 14E:
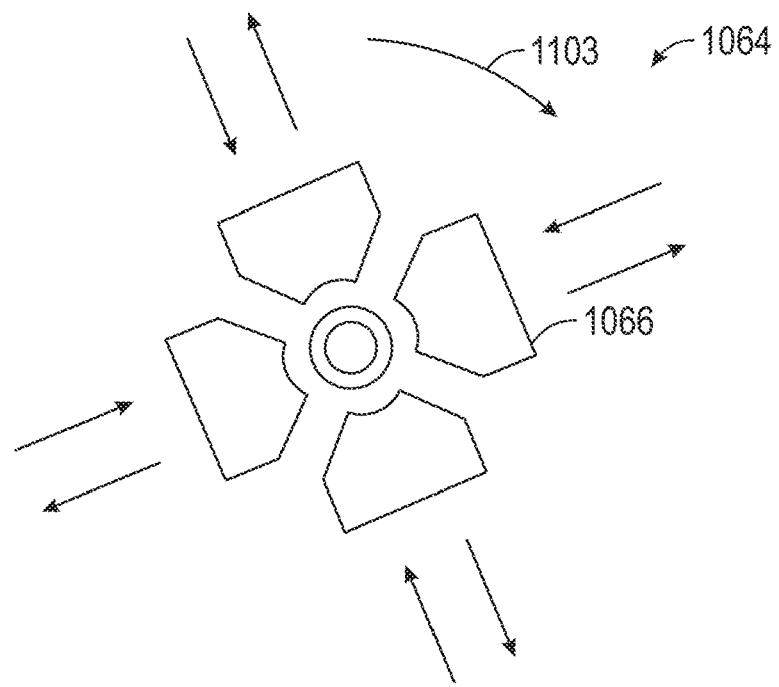
Figure 15:
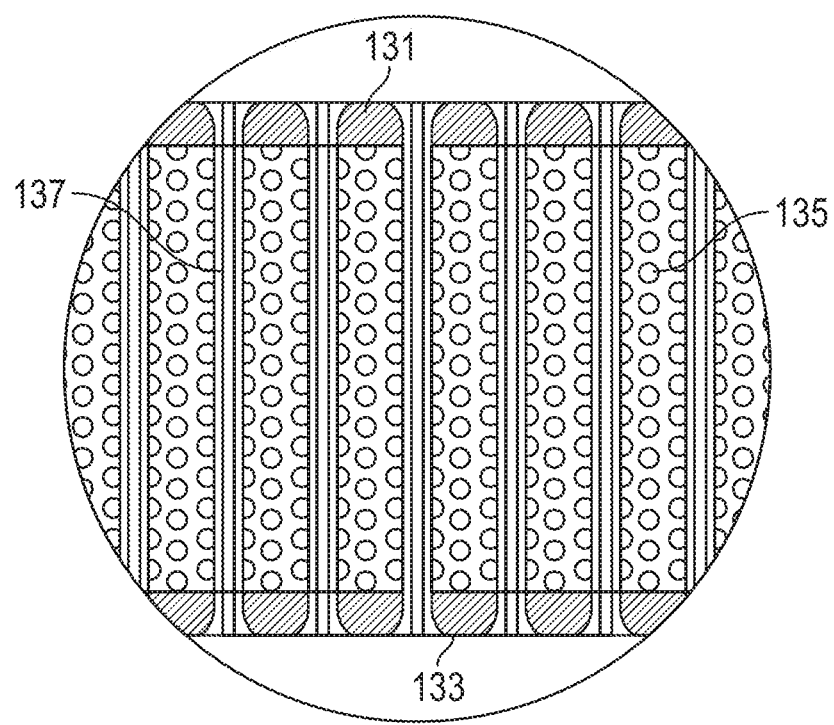
FIG. 15 shows a cross-sectional view of an embodiment of a structural sandwich panel or fiber composite material wall of a surface or part produced by a method described herein. The 3D insertions of fiber is described in applicant's U.S. Pat. Nos. 7,056,576, 7,217,453, 7,731,046, 7,785,693, 7,846,528, 7,387,147, 6,676,785, 6,645,333, 7,105,071, 8,002,919, and 8,272,188, which are incorporated by reference herein.

FIG. 13B also shows the cylindrical surface 1047 on upper die 1043 and lower die 1045. This is ideally hardened steel and chromed. The cylindrical surface 1047 is approximately 120 degrees or $\frac{1}{3}^{rd}$ of a complete circle and is ground to a finish dimension for the outside of the tubular thermoplastic lineal 1053. The angle of this could be greater, up to 150 degrees or slightly more. It is not appropriate to bring this cylindrical surface to a complete semi-circle at 180 degrees however, because the closing of the die sets would catch material and jam the parting line as the die set would run parallel to the pre-pregged material at around 1 degree and 179 degrees. The goal is to apply pressure into the part, not parallel to the part. An alternative to FIG. 13B, as shown in FIGS. 14D and 14E, would be to have a die set 1064 including four die plates/members 1066 that all converge and clamp on the tubular thermoplastic lineal 1053 in unison. These four die plates 1066 would of course have an equivalent cylindrical surface 1047 that is only 88 degrees or so and chamfered so that any one of the four die plates 1066 would not touch each other. But four would allow a significant normal force over a substantial amount of the 360 degrees of the outside circumference to be imparted to the tubular composite wall, against the stationary mandrel 1051.

This brings the invention to a new and useful configuration to accomplish the robotic manufacture of tubular thermoplastic composite lineals. By rotating the die set(s) of FIGS. 13A-14E, one can achieve full consolidation of 360 degrees of the tube surface. In FIGS. 14A-14C, the rotation of the die set to three prescribed locations is shown. In FIGS. 13B-14E, the hardware of the die assembly 1046 for rotating the die set is omitted for clarity. The views in FIGS.

14A-14E are from the perspective of the cold end or downstream end of the die sets.

By examining FIG. 14A, one can see both the upper die 1043 and the lower die 1045, as viewed from the downstream side. Shown here in FIG. 14A is the tubular lineal 1053, along with the end of the stationary steel mandrel, now shown as 1051. Note that the stationary steel mandrel 1051 terminates at the cold end of the discharge of the die plates. That is, there is no need for the mandrel 1051 once the tube is hardened and cold. Note in this view the tubular lineal 1053 includes the release material 1013, but the cross section does not differentiate these two materials in the figure. The two arrows above the die set in FIG. 14A show a counterclockwise rotation looking upstream 1101 and clockwise rotation looking upstream 1103. When the robotic machinery of the die assembly 1046 rotates the die set according to arrow 1101, the machinery of the die assembly 1046 achieves the die set orientation of FIG. 14B. When the robotic machinery of the die assembly 1046 rotates the die set according to arrow 1103, the machinery of the die assembly 1046 achieves the die set orientation of FIG. 14C. Each of these new rotational orientations, when achieved, are the position another clamp cycle is achieved at zero line speed.

Of course the number of orientations and angular rotations can be more or less than the three shown by FIG. 14. However there must be at least two, for the reasons explained earlier.

There are a myriad of applications for long thermoplastic composite tubular lineals. They range from small diameter tubes for aerospace, transportation, oil and gas, and recreation to medium diameter tubes for piping and duct work to large tubular structures from pipe, to fuselages, to underground storage tanks. It is not out of the question that a large diameter "hyperloop" tube (per Tesla disclosure) could be made with this invention. If the processing equipment were mounted on a moveable platform the tube could conceivably be continuous with very few joints.

Additionally, thermoplastic composites are known to weld to each other with very high degrees of success. Using the spherical formation technology disclosed earlier herein for radomes, a large spherical end-cap could be welded to a large cylindrical, long tube to fabricate the afore-mentioned underground storage tanks. U.S. Pat. Nos. 9,610,737 and 9,616,623, which related to applicant's 3D shaping technology and show its use, for example, in shaping the elements of an airplane fuselage, are incorporated by reference herein. An entire fuselage from nose to tail could be fabricated with a combination of applicant's technology using thermoplastic composites.

The example computer system 550 shown and described with respect to FIG. 11 provides the computer control described here for the 3D thermoplastic pultrusion system and method.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A method of processing a thermoplastic composite tubular lineal, comprising:
   providing a pre-pregged thermoplastic composite around an elongated stationary mandrel;
   wrapping the pre-pregged thermoplastic composite with a release material;
   heating the stationary mandrel so that the pre-pregged thermoplastic composite melts and the release material contracts, exerting pressure on the pre-pregged material;
   automatically clamping two or more die members with partially circular inner surfaces onto the pre-pregged material and release material;
   automatically unclamping the two or more die members from the pre-pregged material and release material;
   rotating the two or more die members about the stationary mandrel;
   repeating the clamping and unclamping at two or more circumferential locations on the thermoplastic composite tubular lineal with the two or more die members so that full consolidation of 360 degrees of a surface of the pre-pregged material and release material into a round annular shape occurs;
   pulling the thermoplastic composite tubular lineal downstream;
   removing the release material from the thermoplastic composite tubular lineal.

2. The method of claim 1, wherein providing a pre-pregged thermoplastic composite includes automatically circumferentially spacing pre-pregged thermoplastic composite material around a circumference of the elongated stationary mandrel.

3. The method of claim 1, wherein wrapping the pre-pregged thermoplastic composite with a release material includes automatically rotating the release material around the elongated stationary mandrel and wrapping the release material around the pre-pregged thermoplastic composite.

4. The method of claim 3, wherein wrapping the pre-pregged thermoplastic composite with a release material includes automatically wrapping the release material at an angle around the pre-pregged thermoplastic composite.

5. The method of claim 4, wherein the angle is 45 degrees.

6. The method of claim 1, wherein heating the stationary mandrel includes automatically heating the stationary mandrel with an induction heater and welder.

7. The method of claim 6, wherein the induction heater and welder includes water-cooled coils and loops, and the method further includes providing the water-cooled coils and loops coiled around the stationary mandrel and movable pre-pregged thermoplastic composite.

8. The method of claim 6, wherein heating the stationary mandrel so that the pre-pregged thermoplastic composite melts and the release material contracts includes automatically heating the stationary mandrel so that the release material contracts 20-40%.

9. The method of claim 6, wherein heating the stationary mandrel includes automatically raising a temperature in the stationary mandrel at least 100 degrees in 1 second or less with an induction heater and welder.

10. The method of claim 1, wherein pulling the thermoplastic composite tubular lineal downstream includes automatically pulling the thermoplastic composite tubular lineal downstream with a series of grippers.

11. The method of claim 10, wherein removing the release material from the thermoplastic composite tubular lineal occurs upstream or downstream of the series of grippers.

12. The method of claim 1, wherein the two or more die members each include an upstream heating section and a downstream cooling section, and the method further including heating the pre-pregged material and release material with the upstream heating section and cooling the pre-pregged material and release material with the downstream cooling section.

13. The method of claim 1, wherein the pre-pregged material and release material is automatically moved incrementally, and the clamping and unclamping steps are performed when the pre-pregged material and release material is at zero line speed.

14. The method of claim 1, wherein the pre-pregged thermoplastic composite includes one or more fibers from the group of glass, carbon, and aramid, and the pre-pregged thermoplastic composite includes one or more thermoplastic resins from the group of polyethylene, polypropylene, polyethylene, terephthalate, polycarbonate, polyetherketone-family (PEK, PEKK, PEEK), and polyphenylene sulfide.

15. The method of claim 1, wherein the thermoplastic composite tubular lineal is 100 to 150 meters in length.

16. The method of claim 1, wherein the thermoplastic composite tubular lineal includes an inside diameter of 2.0 mm to 4.0 meters.

17. The method of claim 1, wherein the thermoplastic composite tubular lineal is made of a wall having one or more of a solid wall, a hybrid mix of wall materials, and a sandwich structure with non-delaminating features.

18. A method of processing a thermoplastic composite tubular lineal, comprising:
    providing a pre-pregged thermoplastic composite around an elongated stationary mandrel;
    wrapping the pre-pregged thermoplastic composite with a release material;
    heating the stationary mandrel so that the pre-pregged thermoplastic composite melts and the release material contracts, exerting pressure on the pre-pregged material;
    automatically clamping two or more die members with partially circular inner surfaces onto the pre-pregged material and release material, the partially circular inner surfaces when clamped contact less than 360 degrees of a surface of the pre-pregged material and release material;
    automatically unclamping the two or more die members from the pre-pregged material and release material;
    rotating the two or more die members about the stationary mandrel;
    repeating the clamping and unclamping at two or more circumferential locations on the thermoplastic composite tubular lineal with the two or more die members so that full consolidation of 360 degrees of a surface of the pre-pregged material and release material into a round annular shape occurs;
    pulling the thermoplastic composite tubular lineal downstream;
    removing the release material from the thermoplastic composite tubular lineal.

19. A method of processing a thermoplastic composite tubular lineal, comprising:
    providing a pre-pregged thermoplastic composite around an elongated stationary mandrel;
    wrapping the pre-pregged thermoplastic composite with a release material;
    heating the stationary mandrel so that the pre-pregged thermoplastic composite melts and the release material contracts, exerting pressure on the pre-pregged material;
    automatically clamping two or more die members with partially circular inner surfaces onto the pre-pregged material and release material, the two or more die members being chamfered so that any one of the two or more die members do not touch each other;
    automatically unclamping the two or more die members from the pre-pregged material and release material;
    rotating the two or more die members about the stationary mandrel;
    repeating the clamping and unclamping at two or more circumferential locations on the thermoplastic composite tubular lineal with the two or more die members so that full consolidation of 360 degrees of a surface of the pre-pregged material and release material into a round annular shape occurs;
    pulling the thermoplastic composite tubular lineal downstream;
  removing the release material from the thermoplastic composite tubular lineal.

20. A method of processing a thermoplastic composite tubular lineal, comprising:
    providing a pre-pregged thermoplastic composite around an elongated stationary mandrel;
    wrapping the pre-pregged thermoplastic composite with a release material;
    clamping two or more die members onto the pre-pregged material and release material, the two or more die members including partially circular inner surfaces, unclamping the two or more die members from the pre-pregged material and release material, rotating the two or more die members about the stationary mandrel, and repeating the clamping and unclamping at two or more circumferential locations on the thermoplastic composite tubular lineal with the two or more die members so that full consolidation of 360 degrees of a surface of the pre-pregged material and release material into a round annular shape occurs;

pulling the thermoplastic composite tubular lineal downstream;

removing the release material from the thermoplastic composite tubular lineal.

21. The method of claim 20, wherein the two or more die members each include an upstream heating section and a downstream cooling section, and the method further including heating and clamping the pre-pregged material and release material with the upstream heating section and cooling and clamping the pre-pregged material and release material with the downstream cooling section.

* * * * *